US012350798B2

(12) United States Patent
Tan et al.

(10) Patent No.: US 12,350,798 B2
(45) Date of Patent: Jul. 8, 2025

(54) NAILERS WITH JAMMING-ALLEVIATING MECHANISMS

(71) Applicant: TECHTRONIC CORDLESS GP, Anderson, SC (US)

(72) Inventors: Ying Xiang Tan, Dongguan (CN); Hai Ling Lin, Dongguan (CN); Xi He, Dongguan (CN); Jin Lin Zhou, Dongguan (CN)

(73) Assignee: Techtronic Power Tools Technology Limited, Tortola (VG)

( * ) Notice: Subject to any disclaimer, the term of this patent is extended or adjusted under 35 U.S.C. 154(b) by 59 days.

(21) Appl. No.: 18/328,426

(22) Filed: Jun. 2, 2023

(65) Prior Publication Data

US 2023/0302617 A1 Sep. 28, 2023

Related U.S. Application Data

(63) Continuation of application No. 16/981,496, filed as application No. PCT/CN2018/097715 on Jul. 30, 2018, now Pat. No. 11,667,018.

(30) Foreign Application Priority Data

May 8, 2018 (CN) ........................ 201810431869.X

(51) Int. Cl.

| | |
|---|---|
| ***B25C 1/04*** | (2006.01) |
| ***B25C 1/00*** | (2006.01) |
| ***B25C 1/06*** | (2006.01) |

(52) U.S. Cl.

CPC .............. *B25C 1/047* (2013.01); *B25C 1/008* (2013.01); *B25C 1/041* (2013.01); *B25C 1/06* (2013.01)

(58) Field of Classification Search

CPC ............ B25C 1/041; B25C 1/047; B25C 1/06

See application file for complete search history.

(56) References Cited

U.S. PATENT DOCUMENTS 3,934,688 A 1/1976 Sides et al.
4,502,353 A 3/1985 Beaudoin
(Continued)

FOREIGN PATENT DOCUMENTS

CN 2100290 U 4/1992
CN 1997488 A 7/2007
(Continued)

OTHER PUBLICATIONS

Search Report issued by the Chinese Patent Office for Application No. 201880093206.X dated Apr. 18, 2024 (3 pages including statement of relevance).
(Continued)

*Primary Examiner* — Joshua G Kotis

(74) *Attorney, Agent, or Firm* — Michael Best & Friedrich LLP

(57) ABSTRACT

A fastener tool includes a motor, a drive mechanism connected to the motor and adapted to drive a piston, and a cylinder filled with compressed gas. The piston is accommodated in the cylinder and suitable for a reciprocating motion within the cylinder. The drive mechanism includes a blade fixed to the piston, and a gear coupled to the motor. The gear contains a plurality of teeth adapted to engage with a plurality of lugs on the blade such that a rotation of the gear is transformed to a linear movement of the blade. The drive mechanism further includes a disengagement module which within a period of a rotation cycle of the gear, is configured to prevent one of the plurality of teeth from unintentionally engaging with a misaligned one of the lugs.

13 Claims, 16 Drawing Sheets

(56) References Cited

U.S. PATENT DOCUMENTS

| | | | | |
|---|---|---|---|---|
| 5,174,485 | A | 12/1992 | Meyer | |
| 7,506,788 | B2 | 3/2009 | Liang et al. | |
| 9,408,606 | B2 | 8/2016 | Shelton, IV | |
| 11,667,018 | B2 * | 6/2023 | Tan | B25C 1/06<br>227/8 |
| 2004/0232194 | A1 | 11/2004 | Pedicini et al. | |
| 2005/0242154 | A1 | 11/2005 | Leimbach | |
| 2008/0190986 | A1 | 8/2008 | Chang et al. | |
| 2009/0090759 | A1 | 4/2009 | Leimbach et al. | |
| 2011/0198381 | A1 | 8/2011 | McCardle et al. | |
| 2011/0248062 | A1 | 10/2011 | Fujimoto | |
| 2015/0158160 | A1 | 6/2015 | Kato | |
| 2016/0096259 | A1 | 4/2016 | Pedicini | |
| 2016/0288305 | A1 | 10/2016 | McCardle et al. | |
| 2017/0190037 | A1 | 7/2017 | Sato et al. | |
| 2018/0126528 | A1 | 5/2018 | Pomeroy et al. | |
| 2018/0126530 | A1 * | 5/2018 | Pomeroy | B25C 1/047 |
| 2018/0154505 | A1 * | 6/2018 | Sato | B25C 1/047 |
| 2019/0126453 | A1 | 5/2019 | Po | |
| 2019/0202042 | A1 * | 7/2019 | Wu | B25C 1/047 |
| 2019/0321955 | A1 * | 10/2019 | Carrier | B25C 1/04 |
| 2020/0164498 | A1 | 5/2020 | Wechselberger et al. | |
| 2021/0101272 | A1 * | 4/2021 | Saitou | B25C 1/047 |
| 2021/0138622 | A1 * | 5/2021 | Enta | B25C 1/047 |
| 2021/0205969 | A1 * | 7/2021 | Zhu | B25C 1/06 |
| 2021/0308852 | A1 * | 10/2021 | Ueda | B25C 1/047 |

FOREIGN PATENT DOCUMENTS

| | | | |
|---|---|---|---|
| CN | 201111458 | Y | 9/2008 |
| CN | 101288962 | A | 10/2008 |
| CN | 106654801 | A | 5/2017 |
| CN | 206154233 | U | 5/2017 |
| CN | 107249823 | A | 10/2017 |
| CN | 107708934 | A | 2/2018 |
| CN | 107803790 | A | 3/2018 |
| CN | 107914242 | A | 4/2018 |
| CN | 207206347 | U | 4/2018 |
| CN | 108068059 | A | 5/2018 |
| EP | 3263286 | A1 | 1/2018 |
| EP | 3308907 | A1 | 4/2018 |
| JP | 2016221610 | A | 12/2016 |
| WO | 2016160699 | A1 | 10/2016 |

OTHER PUBLICATIONS

International Search Report and Written Opinion for Application No. PCT/CN2018/097715 dated Feb. 11, 2019 (7 pages).

Extended European Search Report for Application No. 18918279.3 dated Jan. 13, 2022 (5 pages).

Partial Supplementary European Search Report for Application No. 18917890.8 dated May 16, 2022 (12 pages).

Extended European Search Report for Application No. 18917890.8 dated Sep. 2, 2022 (14 pages).

* cited by examiner

NAILERS WITH JAMMING-ALLEVIATING MECHANISMS

CROSS-REFERENCE TO RELATED APPLICATIONS

This application is a continuation of U.S. patent application Ser. No. 16/981,496 filed on Sep. 16, 2020, which is national phase filing under 35 U.S.C. § 371 of International Application No. PCT/CN2018/097715 filed on Jul. 30, 2018, which claims priority to Chinese Patent Application No. 201810431869.X filed on May 8, 2018, the entire contents of all of which are incorporated herein by reference.

FIELD OF THE INVENTION

This invention relates to power tools, and more particularly to fastener tools that are adapted to drive fasteners into workpieces.

BACKGROUND OF THE INVENTION

Fastener tools such as nail guns (a.k.a. nailers) often use high-pressure gas as a power source to drive a workpiece such as nails or the like to eject from the tool at a high speed. Generally speaking, during each cycle of a workpiece being fired, it is necessary to firstly compress the high-pressure gas in a cylinder to a certain extent so that the piston is in position. Then the piston is released at the moment it is fired, which produces a powerful kinetic energy to complete the striking operation. This cylinder-piston configuration is commonly referred to as "gas spring".

Conventional pneumatic tools typically use a two-cylinder configuration, one for energy accumulation and the other one for striking. The two cylinders are coaxially arranged in a nested manner. For the energy-accumulating cylinder, an electric motor is generally used to drive an accumulator piston through a pinion and a rack, and the accumulator piston can cause the high-pressure gas to be compressed. Once the compression is completed, a striking piston in the striking cylinder is released. After one striking cycle is completed, both the accumulator piston and the striking piston need to be moved to their initial positions respectively in order to prepare for the next striking cycle. This working principle causes the internal structure of the pneumatic tool to be very complicated and easily causes various failures. In particular, conventional pneumatic tools are vulnerable to nail jam which once happened would cost the user a huge amount of time to remove the jammed nails.

SUMMARY OF THE INVENTION

The present invention provides, in one aspect, a fastener tool including a motor, a drive mechanism connected to the motor and adapted to drive a piston, and a cylinder filled with compressed gas. The piston is accommodated in the cylinder and suitable for a reciprocating motion within the cylinder. The piston is connected to a striking element suitable for striking a workpiece. The drive mechanism includes a blade fixed to the piston, and a gear coupled to the motor. The gear contains a plurality of teeth adapted to engage with a plurality of lugs on the blade such that a rotation of the gear is transformed to a linear movement of the blade. The drive mechanism further includes a disengagement module which is adapted to, within a period of a rotation cycle of the gear, prevent one of the plurality of teeth from unintentionally engaging with a misaligned one of the lugs of the plurality of the blade.

The present invention provides, in another aspect, a fastener tool including a motor, a drive mechanism connected to the motor and adapted to drive a piston, and a cylinder filled with compressed gas. The piston is accommodated in the cylinder and suitable for a reciprocating motion within the cylinder. The drive mechanism includes a blade fixed to the piston and a gear coupled to the motor. The gear contains a plurality of teeth adapted to engage with a plurality of lugs on the blade such that a rotation of the gear is transformed to a linear movement of the blade. The gear further includes a gear body and a movable tooth. The movable tooth is configured, within a period of a rotation cycle of the gear, to move along the gear body to prevent the movable tooth from unintentionally engaging with a misaligned one of the lugs of the blade.

The present invention provides, in yet another aspect, a fastener tool including a motor, a drive mechanism connected to the motor and adapted to drive a piston, and a cylinder filled with compressed gas. The piston is accommodated in the cylinder and suitable for a reciprocating motion within the cylinder. The drive mechanism includes a blade fixed to the piston and a gear coupled to the motor. The gear contains a plurality of teeth adapted to engage with a plurality of lugs on the blade such that a rotation of the gear is transformed to a linear movement of the blade. A first tooth of the plurality of teeth is movable relative to a gear body between an extended position and a shrunken position. The drive mechanism further includes a disengagement module configured to block a path of the first tooth from the extended position to the shrunken position, allowing the first tooth to engage with the lugs of the blade. The disengagement module is further configured to release a path of the first tooth during a period of rotation of the gear, allowing the first tooth to move to the shrunken position.

BRIEF DESCRIPTION OF FIGURES

The foregoing and further features of the present invention will be apparent from the following description of preferred embodiments which are provided by way of example only in connection with the accompanying figures, of which.

In the drawings, like numerals indicate like parts throughout the several embodiments described herein.

DETAILED DESCRIPTION

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

As used herein and in the claims, "couple" or "connect" refers to electrical coupling or connection either directly or indirectly via one or more electrical means unless otherwise stated.

Terms such as "horizontal", "vertical", "upwards", "downwards", "above", "below" and similar terms as used herein are for the purpose of describing the invention in its normal in-use orientation and are not intended to limit the invention to any particular orientation.

Figure 1:
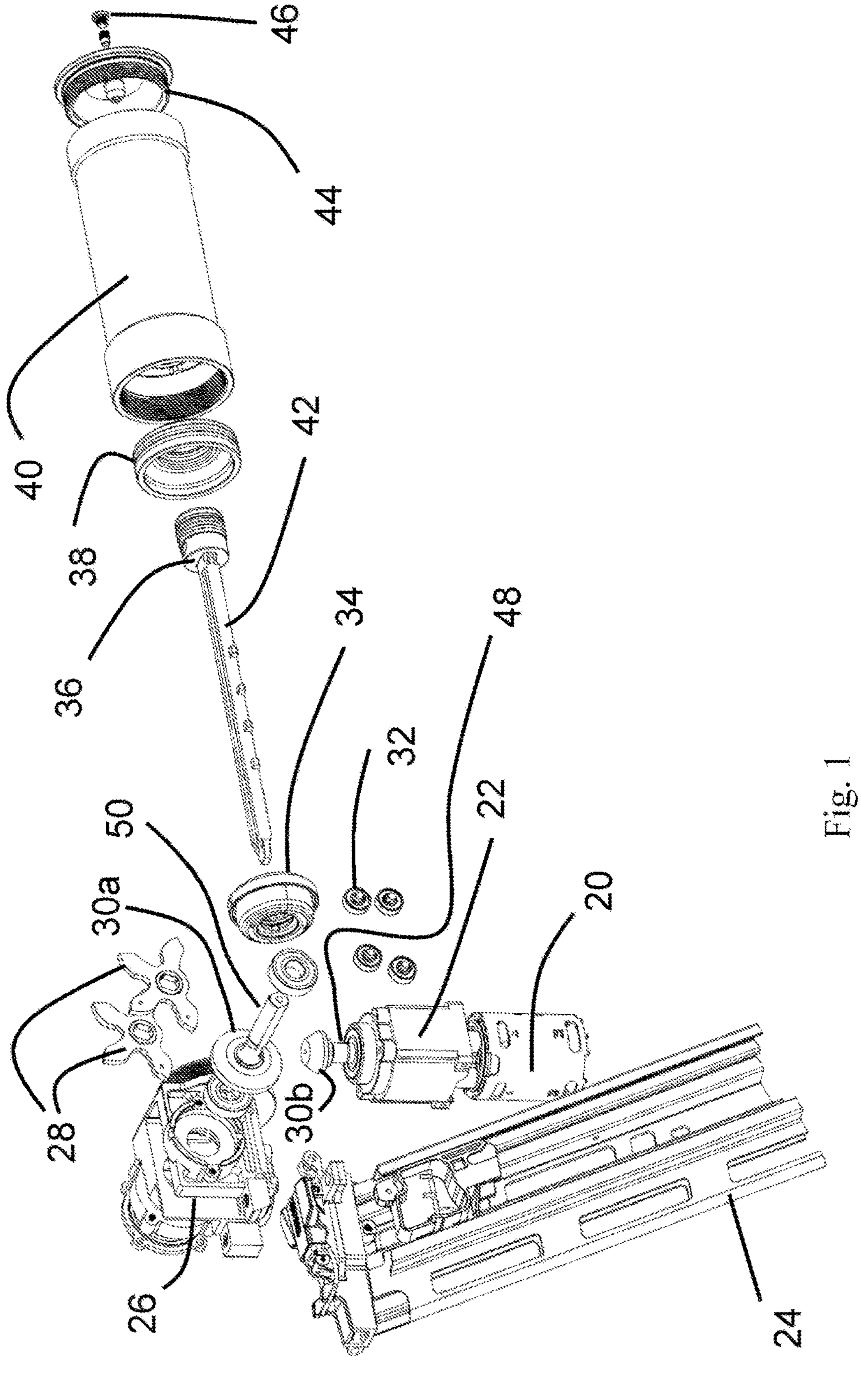
FIG. 1 shows an exploded view of an internal structure of a pneumatic tool according to an embodiment of the present invention.
Figure 2:
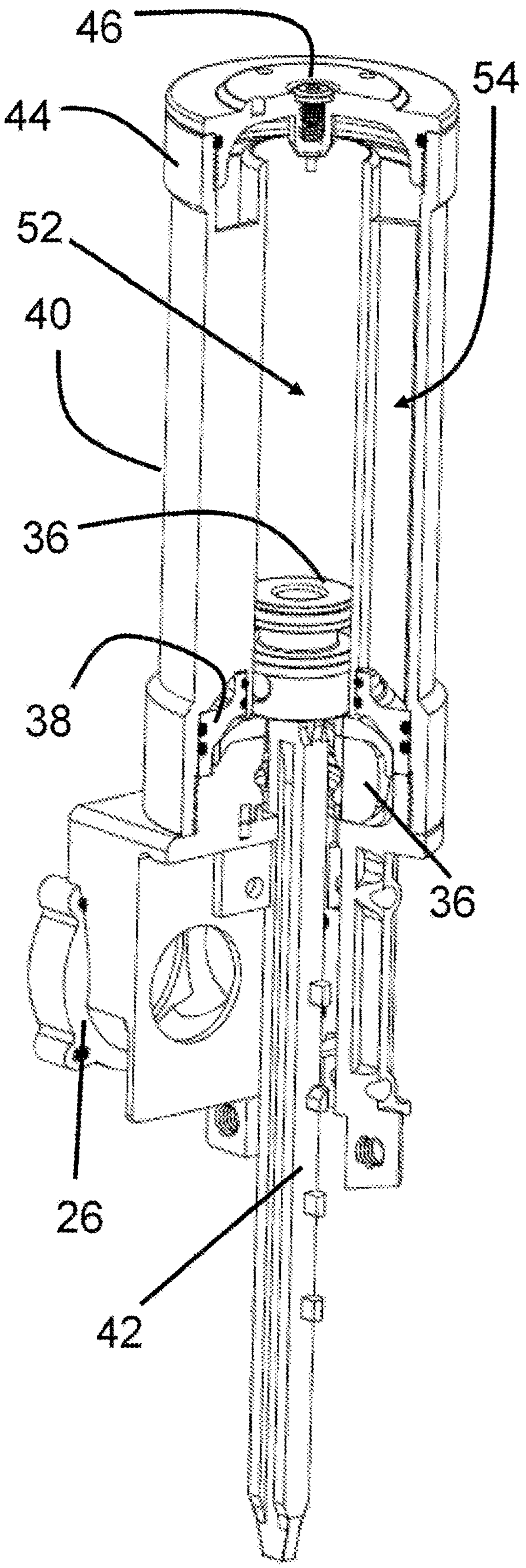
FIG. 2 is a perspective sectional view of a portion of the internal structure of the pneumatic tool in FIG. 1.

Referring to FIGS. 1 and 2, in a first embodiment of the present invention, a pneumatic tool, in particular a nail gun (or called a nailer), is disclosed. The nail gun includes housing, a handle, etc. as are well known to those skilled in the art but which are not shown here for the sake of simplicity. In contrast, a cylinder 40, an end cap 44 at the end of the cylinder 40, and a valve 46 on the end cap 44 are shown directly in FIGS. 1 and 2. The cylinder 40 is the only cylinder in the nail gun. Both ends of the cylinder 40 are open, and one end needs to be closed by the end cap 44. The valve 46 is used to connect to a source of high-pressure gas external to the pneumatic tool (e.g., an air compressor, not shown) and controls the amount of high-pressure gas entering the cylinder 40. A piston 36 is received within the cylinder 40 and is adapted to reciprocate therein. The piston 36 and the cylinder 40 together form the gas spring of the pneumatic tool. The piston 36 is connected to one end of a drive blade 42 (in this embodiment as an intermediate member). The blade 42 has an elongated shape adapted to directly strike a workpiece (e.g., a nail) through a striking element at the other end of the blade 42 to achieve the working effect of the nail gun. In order to ensure the airtightness of the cylinder 40, at the other end of the cylinder 40 (which is the end far away from the end cap 44), a gasket 38 and a cushion 34 are arranged to prevent any accidental leakage of high-pressure gas from the cylinder 40, and to prevent an impact by the piston 36 from affecting other parts of the nail gun. A magazine 24 is removably attached to a front end of the nail gun.

In addition, at the front end of the nail gun, a motor 20 and a drive mechanism are disposed. The drive mechanism includes a gear box 22 (in this embodiment as a speed change mechanism) connected to the motor 20, and several other components connected to the gear box 22. Specifically, the drive mechanism includes respectively a main gear 30*b* located on an output shaft 48 of the gear box 22 and a drive shaft 50 arranged perpendicular to the output shaft 48. A slave gear 30*a* is fixed to the drive shaft 50. The slave gear 30*a* and the main gear 30*b* mesh with each other to perform a direction change of the rotational movement. In addition, two mutually parallel drive gears 28 (as actuators in this embodiment) are also fixed on the drive shaft 50. The drive shaft 50 is fixed to a frame 26 by a bearing (not shown), and the frame 26 is fixed to the housing (not shown) of the nail gun. Note that the various gears described above, the motor 20, and the gear box 22 are not shown in FIG. 2, and FIG. 2 shows the state where the piston 36 is at the bottom dead center of its stroke.

Figure 3A:
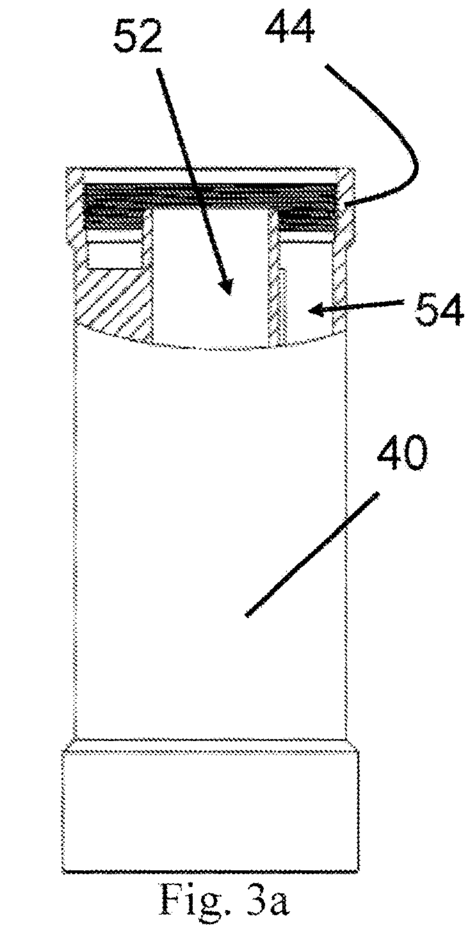
FIGS. 3*a* and 3*b* are respectively an axial cross-sectional view and a radial cross-sectional view of the cylinder in the pneumatic tool of FIG. 1.
Figure 3B:
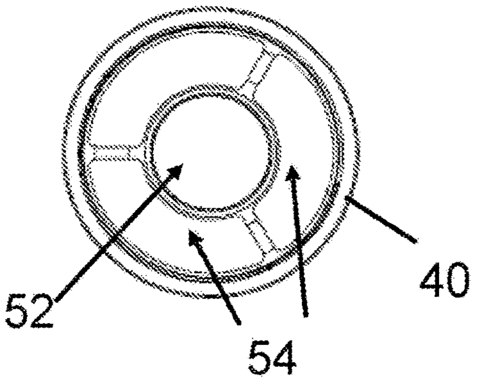

The structure of the cylinder 40 is more clearly shown in FIGS. 3*a*-3*b*. The cross-sectional view of FIG. 3*b* shows that the cylindrical inner space of the cylinder 40 is divided into three equal fan-shaped chambers 54 plus a centrally located circular chamber 52. Here, the fan-shaped chamber 54 is also referred to as a sub chamber, and the circular chamber 52 is also referred to as a main chamber. The sub chambers 54 surround the main chamber 52 and all of them are parallel to each other. Note that all of the sub chambers 54 and the main chamber 52 are in gaseous communication, and they communicate at a position close to the end cap 44. The above-mentioned piston 36 is accommodated in the main chamber 52 and is adapted to reciprocate therein.

Figure 5B:
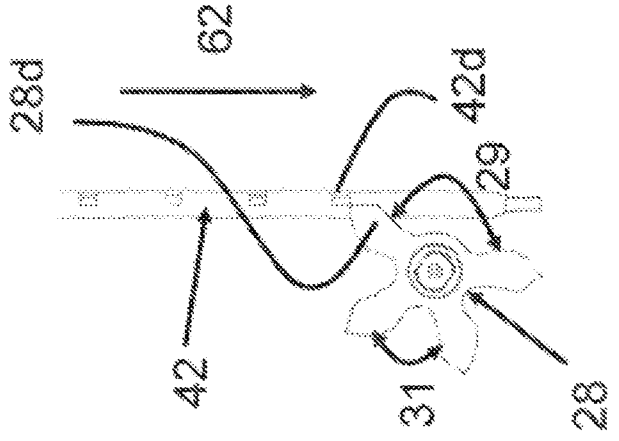
FIG. 5*b* shows a schematic view of the pneumatic tool of FIG. 1 during the striking cycle when the gear is disengaged from the mechanical connection with the drive blade so that the piston can be released.
Figure 5A:
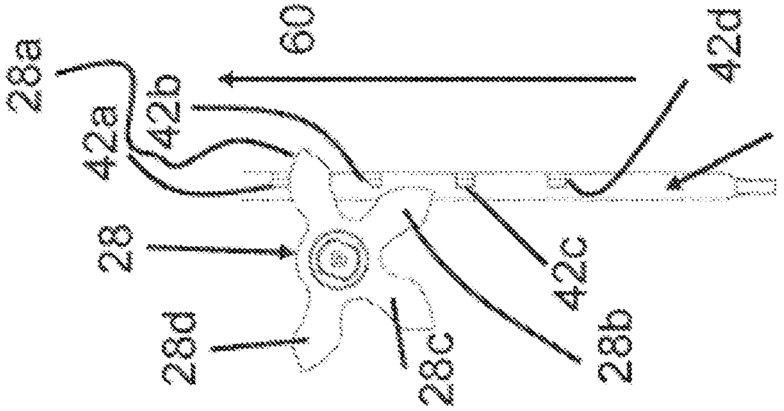
FIG. 5*a* shows an illustration of the compression of the high-pressure gas by the gear-driven blade during the striking cycle of the pneumatic tool of FIG. 1.
Figure 4:
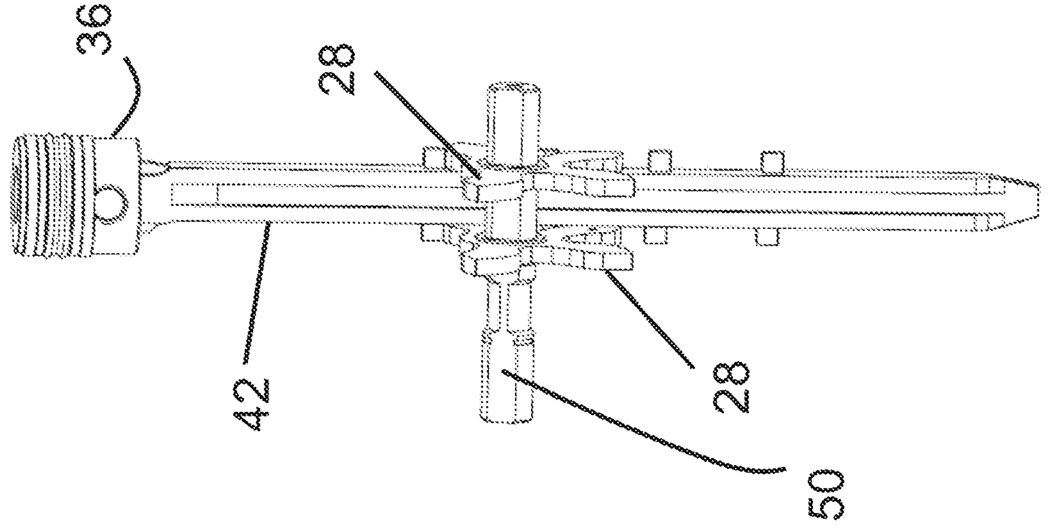
FIG. 4 shows a connection diagram of the piston, the drive blade and the gear in the pneumatic tool of FIG. 1 separately.
Figure 6:
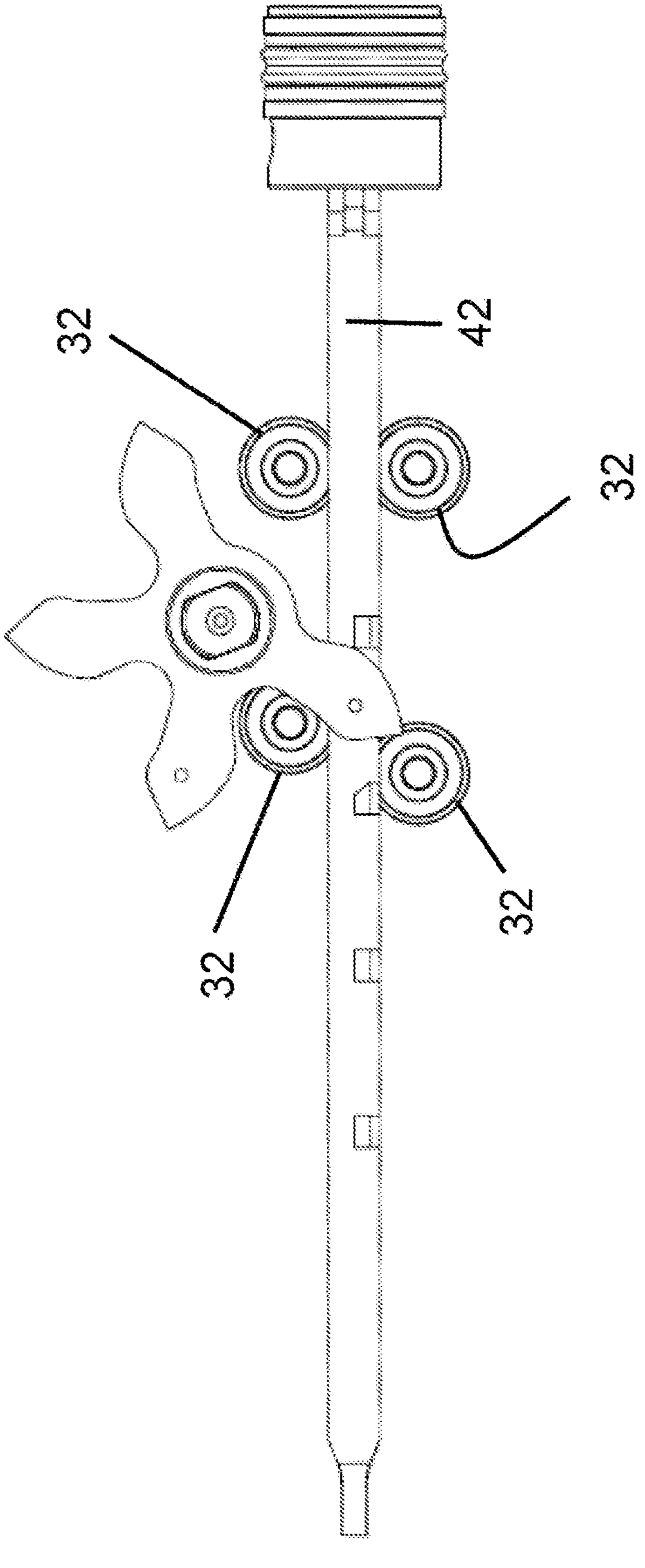
FIG. 6 shows a connection diagram of the piston, the bearing, the drive blade, and the gear in the pneumatic tool in FIG. 1.

FIGS. 4-6 clearly show the details of the above-mentioned drive mechanism. Specifically, there is a specific meshing relationship between the drive blade 42 and the two drive gears 28. On each drive gear 28, there are four teeth 28*a*-28*d* formed, and the two drive gears 28 always rotate synchronously due to their relationship with the drive shaft 50. In other words, at any time for the two drive gears 28, the teeth 28*a*-28*d* are all located at a same angular position. Each one of the teeth 28*a*-28*d* has a shape resembling a dovetail, and they are arranged in the circumferential direction one after another in the clockwise direction shown in FIGS. 5*a*-5*b*. On the drive blade 42, there are two rows of coupling features, and each row contains multiple such coupling features along a length of the blade 42. Specifically, these coupling features in each row are a plurality of lugs 42*a*-42*d* on a side of the drive blade 42. Two rows of such lugs 42*a*-42*d* are respectively located on the two opposite sides of the drive blade 42. As the drive gear 28 is rotatable, it is capable of converting the rotational movement of the drive gear 28 into a linear-direction movement of the drive blade 42. As best shown in FIG. 4, each one of the lugs 42*a*-42*d* in turn corresponds to one of the corresponding teeth 28*a*-28*d* on the drive gear 28 respectively, and such one-on-one correspondence is intended during normal operation of the nail gun. The lugs 42*a*-42*d* are arranged equidistantly from each other on the blade 42. For each drive gear 28, the distances between every two of the four teeth 28*a*-28*d* (here the distance refers to the angular distance in the direction of rotation) are not the same. In contrast, as shown in FIGS. 5*a*-5*b*, the distance 29 between the tooth 28*a* and the teeth 28*d* (herein referred to as a second pitch) is significantly greater than the distance 31 (herein referred to as a first pitch) between the tooth 28*a* and tooth 28*b*, the tooth 28*b* and tooth 28*c*, and the tooth 28*c* and tooth 28*d*. Distance (here called first pitch). As shown in FIGS. 5*a*-5*b*, the second pitch is less than or substantially equal to 180 degrees.

In addition, as shown in FIG. 6, the drive blade 42 is supported by four bearings 32 in the housing of the nail gun (not shown). The four bearings 32 are distributed two by two on both sides of the drive blade 42 and contact the sides of the drive blade 42. It is to be noted that in order to prevent the bearing 32 from interfering with the engagement between the drive gears 28 and the lugs 42*a*-42*d* described above, the two sides where the bearings 32 are located are different from the two sides where the lugs 42*a*-42*d* are located.

Now look at the working principle of the nail gun in the above embodiment. When the user activates the nail gun (e.g., by pressing a trigger), the motor 20 in FIGS. 1-2 begins to rotate, and the raw high-speed rotary motion outputted by the motor 20 transforms through the gear box 22 to a low-speed, high-torque rotation of the output shaft 48. Such a rotational movement is further converted into a movement in other directions of the drive shaft 50 by intermeshing gears 30*a* and 30*b*, so that a tangential direction of rotation of the drive gears 28 can match with the direction of movement of the drive blade 42. It can be seen that the output shaft 48, the drive shaft 50, and the drive blade 42 are arranged so that their longitudinal directions are perpendicular to each other. The rotation of the drive shaft 50 causes the drive gears 28 to also rotate. Specifically, the drive gear 28 rotate in the counterclockwise direction in FIGS. 5*a* and 5*b*.

Each striking cycle of the nail gun is defined in this embodiment as starting from the drive blade 42 moving away from its bottom dead center position and ending as the drive blade 42 returns to its bottom dead center position after the drive blade 42 has completed the entire stroke. FIG. 5*a* shows the meshing relationship between one of the drive gear 28 and the drive blade 42 when the drive blade 42 is in its bottom dead center position. FIG. 5*b* shows the meshing relationship between the drive gear 28 and the drive blade 42 when the drive blade 42 is in its top dead center position. Starting from FIG. 5*a*, when the striking cycle begins, the drive gear 28 begins to rotate counterclockwise, and tooth 28*a* first contacts and abuts against lugs on the drive blade 42, in particular a lug 42*a*. This is because tooth 28*a* is the first tooth on the rotational direction after the second pitch. This abutment causes the drive blade 42 to produce a movement in the direction shown by arrow 60. The movement of the drive blade 42 causes the piston 36 to also move which in turn compress the high-pressure gas in the cylinder 40. This is the energy accumulation process of the gas spring.

However, as the drive gear 28 continues to rotate, the tooth 28*a* gradually move away from the lug 42*a* and eventually comes out of contact with the lug 42. In theory, such disengagement will cause the drive blade 42 to lose its driving force and the blade 42 will reverse its moving direction since the high-pressure gas has already been compressed. However, since the next tooth 28*b* comes into contact with the next lug 42*b* again in a very short time (which is similar to the tooth 28*a* and the lug 42*a* mentioned above), the duration of pausing and/or reversing of the driving bar 42 is very short which is neglectable. Such one-on-one, successive engagements between the teeth and lugs continue until the last (which the fourth) tooth 28*d* and the last (which is the fourth) lug 42*d* come into contact and eventually come out of contact (as shown in FIG. 5*b*). The above process happens in a time period which is called the first time period of the striking cycle.

Once the tooth 28*d* completely disengages from its contact with the lug 42*d*, the drive blade 42 is then no longer driven by the drive gear 28 for the remainder time of the striking cycle, because the second pitch from the tooth 28*d* to the next tooth which is the first tooth 28*a* is very large such that the drive gear 28 and the drive blade 42 are completely out of mechanical connection. The second period of the striking cycle begins when the tooth 28*d* disengages from its contact with the lug 42*d*. At this point, due to the previous compression of the high-pressure gas in the cylinder 40, the high-pressure gas then drives the piston 36 and in turn drive blade 42 to produce a rapid reverse movement, as shown by arrow 62. This reversed motion releases the energy accumulated by the gas spring, turning it into a powerful kinetic energy, and the end of the drive blade 42 will strike a workpiece such as a nail which leaves the nail gun to complete the nailing action. At the time when the nail is struck, the drive blade 42 returns to its bottom dead center position, and the current striking cycle ends. The next striking cycle starts immediately because the motor keeps running at the same speed all the time and in the same direction, so that the drive gear 28 also rotates in a same direction with a uniform speed.

From the above descriptions, it can be seen that the drive gear 28 contains three first pitches, and the rotation of the driving gear 28 across the three pitches corresponds to the first time period of the above-mentioned striking cycle. The rotation of the drive gear 28 across the second pitch corresponds to the second time period of the striking cycle.

Turning to FIGS. 7 and 8*a*-8*c*, another embodiment of the present invention shows the internal structure of a pneumatic tool. The pneumatic tool contains a drive blade 142 and two parallel drive gears 128 engageable with the drive blade 142. For the simplicity of illustration, other components such as the motor and various gears in the drive mechanism are not shown, but these components are configured and operate in a similar way as those illustrated in FIGS. 1-6. The general working principle of the drive blade 142 and the drive gears 128 in the drive mechanism is also similar to those in FIGS. 1-6, which will not be described in detail here for the sake of simplicity. Instead, only the differences between the embodiment of FIGS. 7-8*c* and that of FIGS. 1-6 will be described herein. The pneumatic tool of FIGS. 7-8*c* contains a jamming-alleviating mechanism which, although not able to completely eliminate nail jam in the nailer, nonetheless facilitate clearing the jammed nail and also protects mechanical parts in the nailer from potential damages caused by moving parts. The jamming-alleviating mechanism contains a disengagement mechanism which includes a number of components including a shrinkable member 160, a respective tooth base 174 on each one of the two drive gears 128, a respective ejecting block 166 for each one of the two drive gears 128, and a respective slider 162 for each one of the two drive gears 128. The shrinkable member 160 is shared by the two drive gears 128 and contains two shrinkable teeth 160*a* positioned to be parallel to each other, so that the operations of the shrinkable teeth 160*a* are synchronized for the two drive gears 128. The tooth base 174 formed on the body of each drive gear 128 and its associated shrinkable tooth 160*a* replaces a complete, fixed tooth on the gear such as that shown in FIGS. 1-6. In particular, the tooth base 174 is located at the position of a first tooth on a gear 128 which is the tooth that first comes into engagement with the blade 142 after the second pitch along the rotational direction of the gear 128. In other words, the first tooth is the tooth which firstly engages with the drive blade 142 during the energy accumulation process of the gas spring. The other teeth of the drive blade 128 include a second tooth 128*b*, a third tooth 128*c*, and a fourth tooth 128*d* which again are ranked based on their sequence of engaging with lugs on the drive blade 142.

Figure 8A:
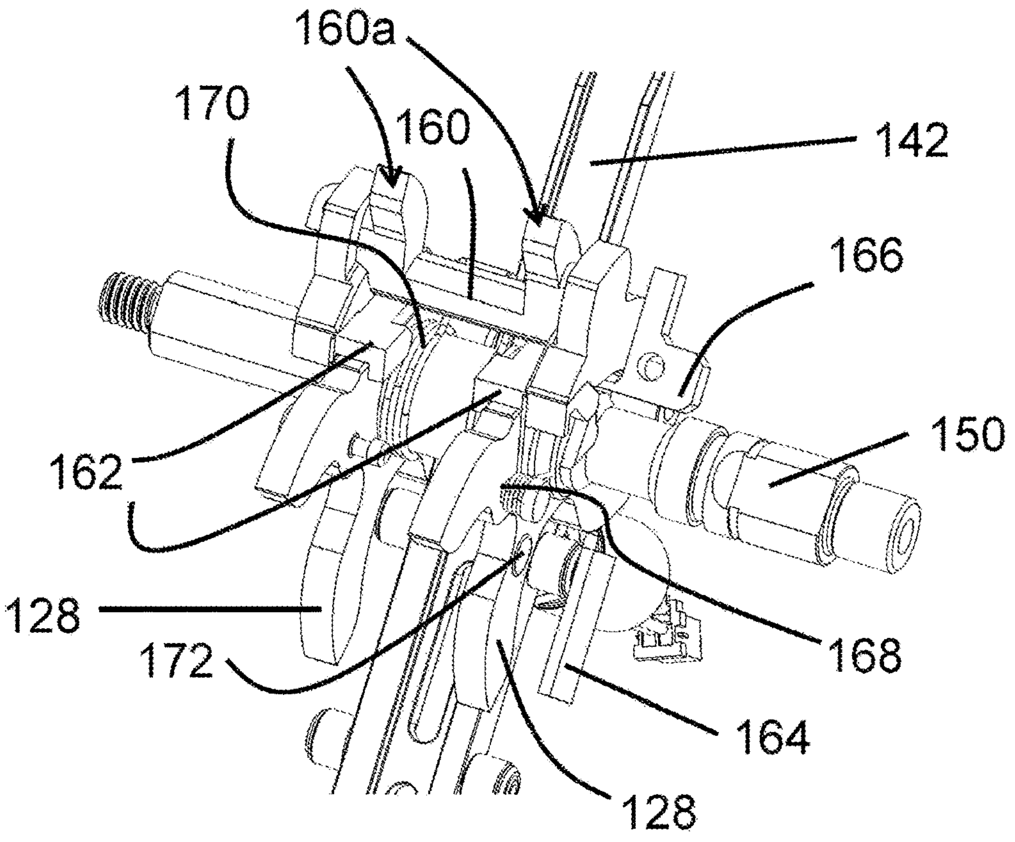
FIGS. 8*a*-8*c* show more details of the drive gears of the pneumatic tool in FIG. 7 from different perspectives.
Figure 8B:
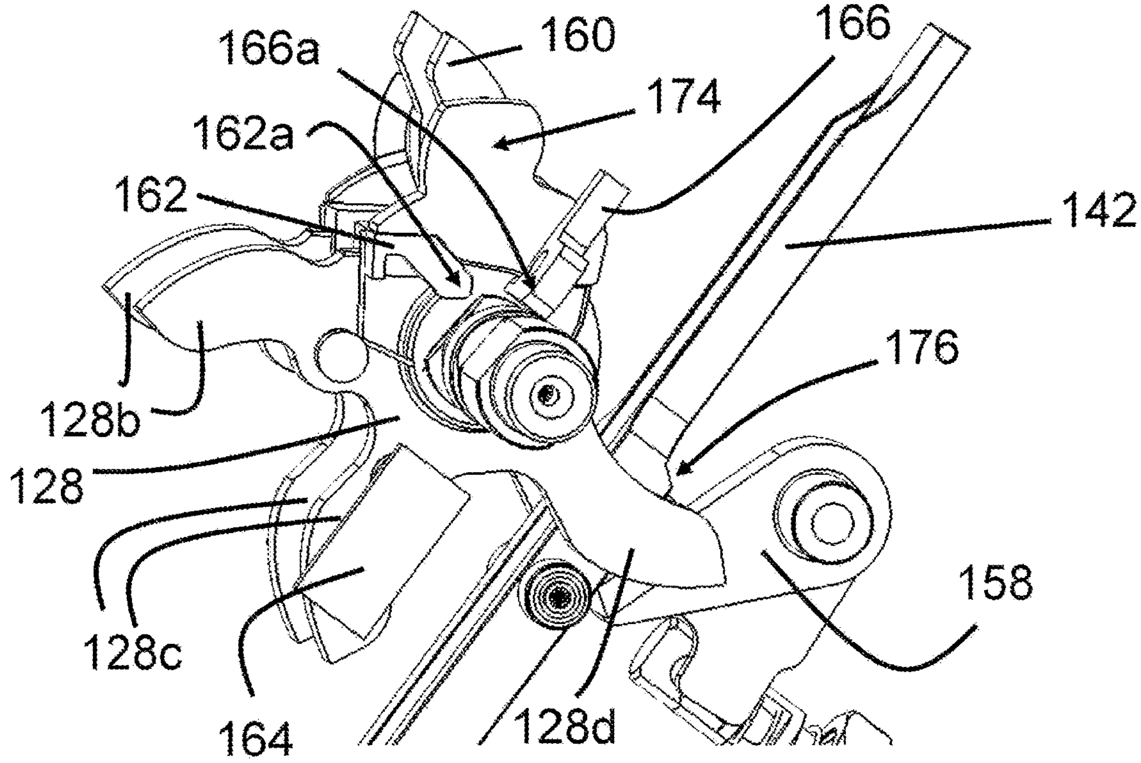
Figure 8C:
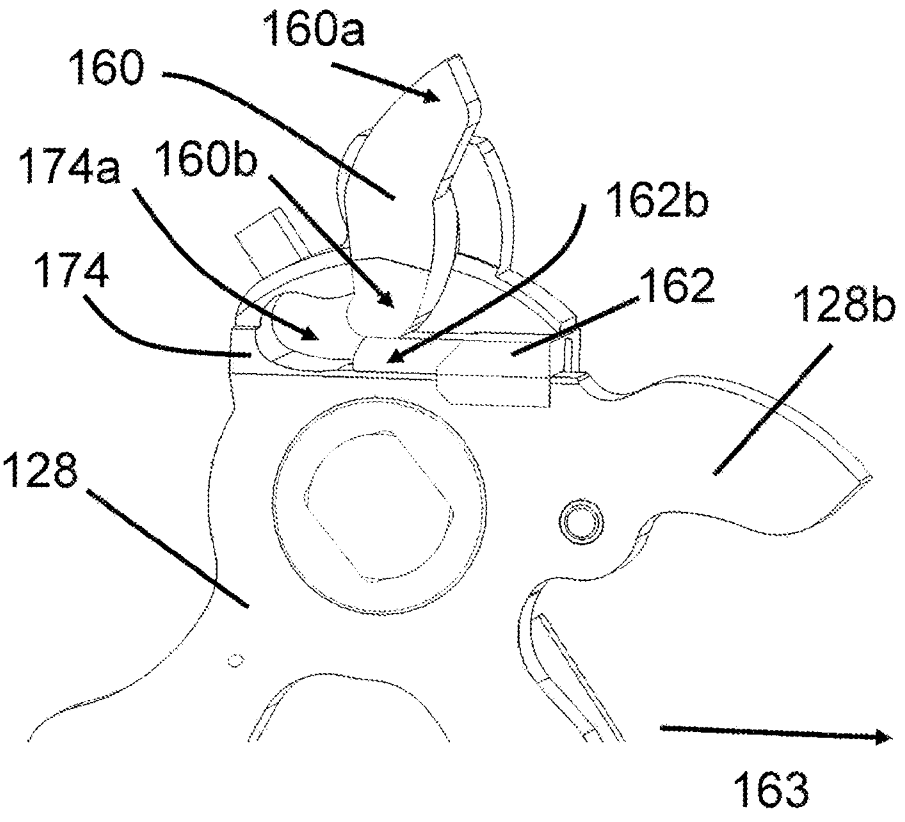

The shrinkable member 160 is movably connected to the two drive gears 128 at the same time. As best shown in FIG. 8*c*, the shrinkable member 160 contains two tail ends 160*b* (only one is shown in FIG. 8*c*) which are opposite to their respective shrinkable teeth 160*a*. For each drive gear 128, a tail end 160*b* is received in and adapted to move along a respective groove 174*a* formed in a tooth base 174 of the drive gear 128. The shrinkable member 160 and its shrinkable teeth 160*a* are movable between an extended position (as shown in FIGS. 8*a*-8*c*), and a shrunken position (not shown). Nonetheless the shrinkable member 160 and its shrinkable teeth 160*a* are biased to the extended position by a coil spring 170 mounted on the main shaft 150 of the drive gears 128.

Figure 7:
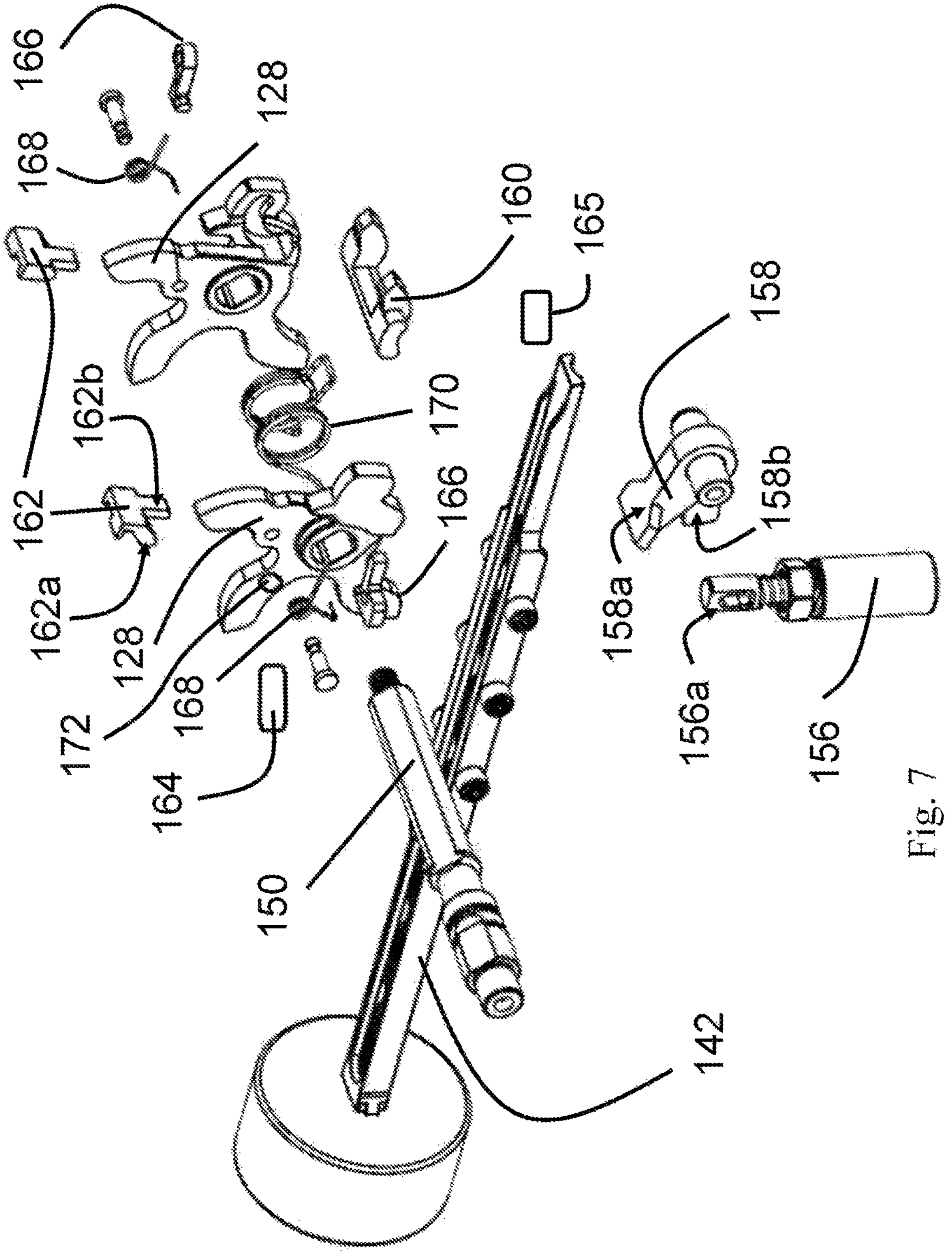
FIG. 7 shows an exploded view of internal structures of a drive mechanism and an disengagement mechanism of a pneumatic tool according to another embodiment of the invention.

On the other hand, FIGS. 7 and 8*c* show that each slider 162 contains a blocking end 162*b* which is also movable into the groove 174*a*. The slider 162 and in particular its blocking end 162*b* is thus a stopper element for the shrinkable member 160. In the status shown in FIG. 8*c*, the blocking end 162*b* of the slider 162 blocks a path of a tail end 160*b* of the shrinkable member 160 so that the tail end 160*b* is prevented from entering fully into the groove 174*a*. FIGS. 7 and 8*b* show another part of the slider 162 including an actuated end 162*a*. The actuated end 162*a* extends substantially along a parallel direction as the blocking end 162*b*, although they are positioned on two sides of a part of a gear 128. The slider 162 is mounted on the drive gear 128 (each slider 162 corresponding to one drive gear 128) so the slider 162 rotates together with the drive gear 128. However, there is allowed a limited relative movement between the slider 162 and the drive gear 128 as the blocking end 162*b* is movable within the groove 174*a* and on the other hand the actuated end 162*a* is unblocked. Each slider 162 is biased to the position as shown in FIG. 8*c* by a coil spring 168 on a respective drive gear 128.

An ejecting block 166 is configured for each one of the drive gear 128 and a slider 162 associated with the drive gear 128. The ejecting blocks 166 are fixed to a part (not shown) of the housing of the nail gun, such as a frame, so the ejecting blocks are not rotatable together with the drive gears 128. During rotation of the drive gears 128, there is a certain time period during which the sliders 162 engage with the respective ejecting block 166. This will be described in more details later.

FIG. 7 also shows other components in the nail gun including a latch 158 connected to a solenoid 156. The solenoid 156 is fixed to a part (not shown) of the housing of the nail gun, and the latch 158 contains a fixed end 158*b* that is coupled to an actuating end 156*a* of the solenoid 156 and a movable end 158*a* that is pivotally connected with the fixed end 158*b*. The solenoid 156 as an electronic device is controlled by a control circuit in the nail gun (not shown) which for example runs a firmware and operates under predetermined control logic. The actuating end 156*a* of the solenoid 156 is adapted to move linearly as is understood by skilled persons in the art, the movement of which also causes the latch 158 to change its status. The movable end 158*a* of the latch 158 is adapted to engage with a recess 142*e* on the drive blade 142. There is also a magnet 172 mounted on the drive gear 128, and in particular on a location on the second tooth 128*b*. A gear sensor 164 which is fixed on a PCB (not shown) is fixed relative to the drive gear 128 and not rotatable therewith. The gear sensor 164 is a Hall sensor for detecting magnetic field produced by the magnet 172. On the other hand, a blade sensor 165 is fixed to the housing of the pneumatic tool near a Bottom Dead Center (BDC) position of the drive blade 142. The blade sensor 165 is therefore not movable with the drive blade 142.

Next, with respect to FIGS. 9*a*-9*e*, the operation and working principle of the disengagement module in the nail gun as described above will be explained. It should be noted that although only one drive gear 128 is illustrated in FIGS. 9*a*-9*e*, the description hereinafter is applicable to both drive gears 128 in the nail gun as they are symmetrical and have a synchronized operation. The drive gear 128 in FIGS. 9*a*-93 rotates along a clockwise direction. During the operation of the nail gun, there is inevitably a possibility that during successive striking of nails out from the nail gun, the nail may be jammed within the gun body. The disengagement module is capable of facilitating the user's cleaning operation of the jammed nail and reducing safety risks by avoiding interference between the drive gears 128 and the drive blade 142 which may cause difficulty to the user during the cleaning process, and thus the disengagement module helps reduce possible damage to the drive mechanism. In particular, the disengagement module prevents the drive blade 142 from stopping at an abnormal position and eliminates any pressing force on the jammer nailer that would otherwise exist without such a disengagement module.

Figure 9A:
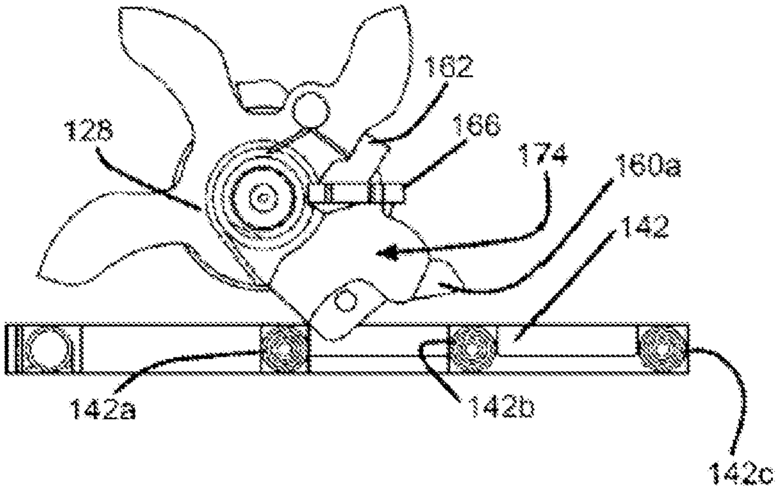
FIGS. 9*a*-9*b* show different status of a drive gear and the drive blade during a normal operation of the pneumatic tool in FIG. 7.
Figure 9B:
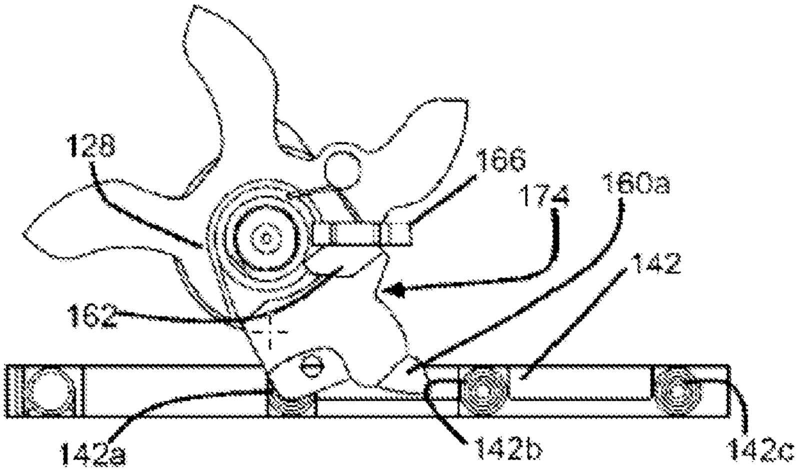

FIGS. 9*a*-9*b* show the operation of a drive gear 128 and its cooperation with the drive blade 142 during normal operations (i.e., when there is no nail jam occurred). The drive gear 128 rotates clockwise so the status shown in FIG. 9*a* is before the status shown in FIG. 9*b*. As mentioned above, the slider 162 is rotatable together with the drive gear 128, but the ejecting block 166 is fixed relative to the drive gear 128 and not rotatable therewith. As a result, when the drive gear 128 rotates continuously, there is a certain time period during which the slider 162 moves into engagement with the ejecting block 166, but outside this time period the slider 162 is away from the ejecting block 166. The time period repeats for every striking cycle of the nail gun, and each striking cycle as mentioned above corresponds to a full rotation of the gear 128. The time period in the striking cycle is determined by the angular position of the gear 128, and more particularly depends on the location of the ejecting block 166 as well as the location of the slider 162 on the gear 128.

When the slider 162 is not engaged with the ejecting block 166 as shown in FIG. 9*b*, as in most of the time in a striking cycle, the slider 162 is biased by its coil spring 168 (see FIGS. 8*a*-8*c*) so that the blocking end 162*b* stays within the groove 174*a* of the tooth base 174. The blocking end 162*b* therefore occupies the path of the tail end 160*b* of the shrinkable member 160 from its extended position to its shrunken position. This is best shown in FIG. 8*c*. Even when the shrinkable tooth 160*a* of the shrinkable member 160 hits a lug on the drive blade 142 and as a result the shrinkable member 160 is urged by the ejecting block 166, the shrinkable tooth 160*a* is not movable when its path is blocked by the blocking end 162*b*. Therefore, the shrinkable tooth 160*a* is kept in its extended position and is in a rigid form which could act as a normal tooth. The shrinkable tooth 160*a* is in its extended position starting from the time shown in FIG. 9*b*, so when later the shrinkable tooth 160*a* contacts the first lug 142*a* the shrinkable tooth 160*a* functions to press on the first lug 142*a* to drive the blade 142 in the energy accumulation process, as in the intended way of operation.

However, when the slider 162 is engaged with the ejecting block 166, the fixed ejecting block 166 produces a pressing force on the slider 162 along a direction shown by arrow 163 in FIG. 8*c*. This pressing force urges the slider 162 to move linearly with the blocking end 162*b* leaving the groove 174*a*. As a result, the path of the tail end 160*b* of the shrinkable member 160 previously occupied by the blocking end 162*b* is now released. Then, assume that during this time period the shrinkable tooth 160*a* hits a lug, and then the shrinkable tooth is able to retract into the tooth base 174 to its shrunken position. However, such a circumstance does not happen in the normal operation in FIGS. 9*a*-9*b* since the time period is chosen such that normally during the time period there is no lug engaging with the shrinkable tooth 160*a*. The above process repeats as long as the nail gun is continuously in operation and if there is no nail jam condition.

Figure 9C:
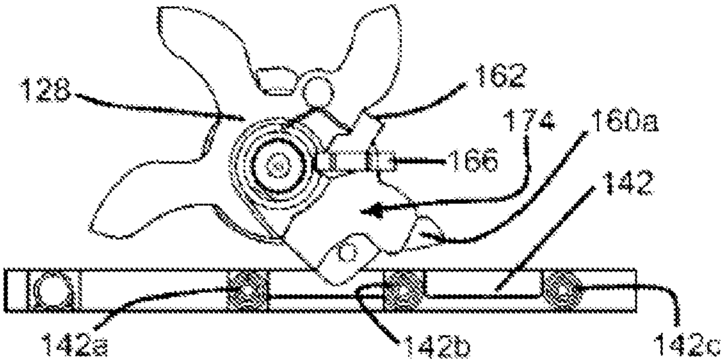
FIGS. 9*c*-9*e* show different status of a drive gear and the drive blade during a abnormal operation of the pneumatic tool in FIG. 7.
Figure 9D:
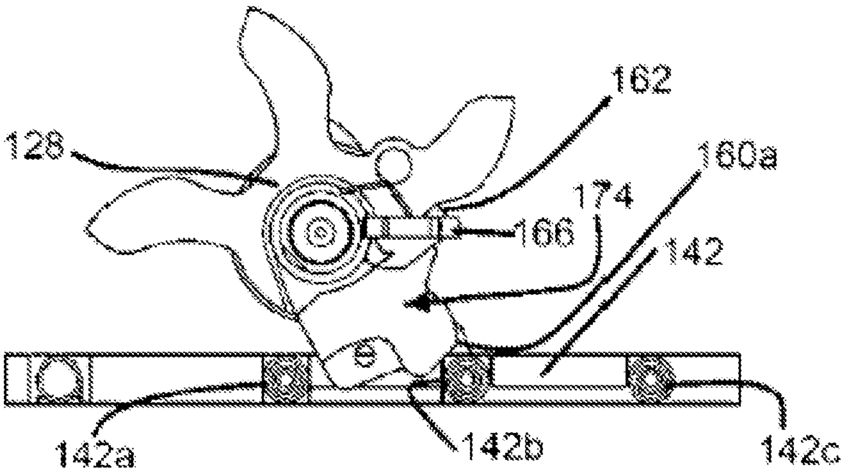
Figure 9E:
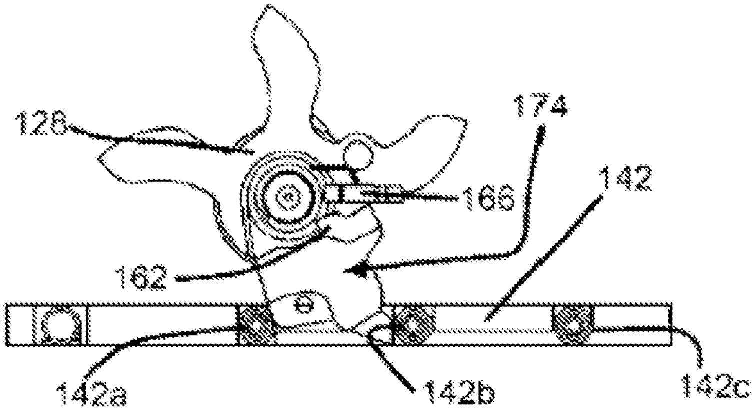

Turning now to FIGS. 9*c*-9*e*, which shows an abnormal circumstance when a nail jam occurred. As the nail (not shown) is jammed, the intended synchronization between the blade 142 and the drive gear 128 is broken, and this is shown in FIG. 9*c* that the shrinkable tooth 160*a* is about to engage with a second lug 142*b* on the drive blade 142 which is not a correct lug for the shrinkable tooth 160*a*. As such, there is a misalignment created between the drive blade 142 and the drive gear 128. FIGS. 9*c*-9*e* show the status of the drive gear 128 in a sequential order. In FIG. 9*c* the slider 162 is still in its biased position so the shrinkable tooth 160*a* is kept in its extended position. However, in FIG. 9*d* the slider 162 is urged by the ejecting block 166, and the slider 162 releases the path of the shrinkable member 160 as mentioned above. The time of engagement of the slider 162 and the ejecting block 166 is carefully chosen so that it happens before the shrinkable tooth 160*a* is about to contact with the second lug 142*b*, which is in turn the most common circumstance when a nail jam happens. However, due to the presence of the shrinkable member 160, in the status of FIG. 9*d* the shrinkable tooth 160*a* can be retracted into the tooth base 174 as it is pressed by the second lug 142*b*. As such, there is no interference between the drive gear 128 and the drive blade 142, and the drive gear 128 is allowed to further rotate to the position shown in FIG. 9*e*. In this way, there is no force applied to the drive blade 142 by the drive gear 128, and when the user needs to take out the jammed nail from the nail gun it will be much easier for him/her to do so.

Figure 10A:
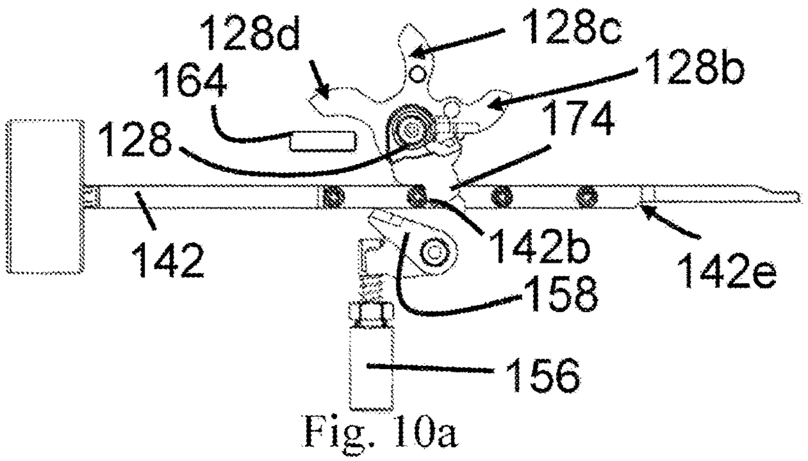
FIGS. 10*a*-10*d* show different status of a drive gear and the drive blade, and an operation of a solenoid during an abnormal operation of the pneumatic tool in FIG. 7.
Figure 10B:
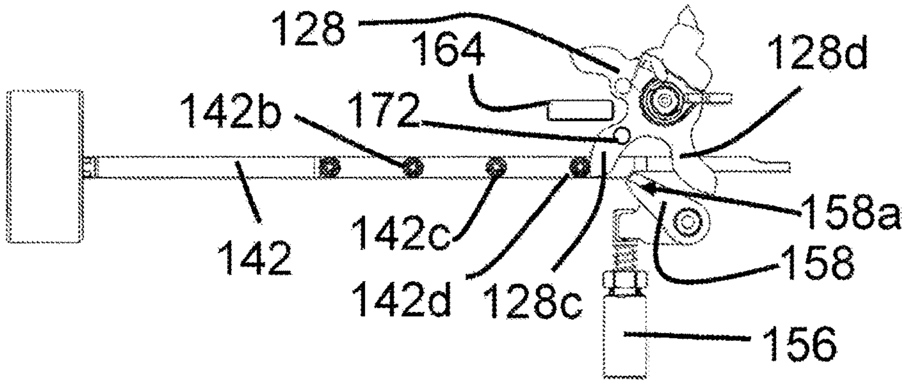

FIGS. 10*a*-10*d* show how the latch 158 and the solenoid 156 operate to lock the drive blade 142 at a predetermined location. Such a predetermined location in this embodiment corresponds to an 85% energy accumulation status in the gas spring as a result of the high-pressure gas compressed to a predetermined extent when the drive blade 142 is at the predetermined location. Also shown in FIGS. 10*a*-10*d* is the illustration how the mechanical parts in the nail gun could be damaged by locking the drive blade 142. It should be noted that although the disengagement module in the descriptions above accompanying FIGS. 9*a*-9*e* help alleviate consequences resulted by nail jam, it is not capable of handling all types of nail jam. In fact, the status shown in FIGS. 10*a*-10*d* is another nail jam scenario. In particular, as shown in FIG. 10*a*, in this nail jam scenario the tooth base 174 does engage with a misaligned second lug 142*b* on the drive blade 142, whereas in the scenario shown in FIGS. 9*c*-9*e* the tooth base 174 does not engage with the second lug 142*b*. In FIG. 10*a*, as the tooth base 174 engages with the second lug 142*b* and the drive gear 128 keeps rotating in the clockwise direction, the drive blade 142 is driven in a misaligned manner with each subsequent tooth after the tooth base 174 also engages with an incorrect lug. In particular, the second tooth 128*b* will engage with a third lug 142*c*, and as shown in FIG. 10*b* the third tooth 128*c* will engage with a fourth lug 142*d*. Consequently, in FIG. 10*b* all the lugs on the drive blade 142 have passed beyond the contact region (not shown) with teeth on the drive gear 128, but the last tooth which is tooth 128*d* is yet to come into the contact region. As mentioned previously, when all the lugs of the drive blade have been engaged with teeth on the drive gear, the energy accumulation process of the gas spring is then completed, and immediately the drive blade will reverse its moving direction and strikes the nail. This will create serious damages to the last tooth 128*d* and other mechanical parts in the nail gun.

Figure 10C:
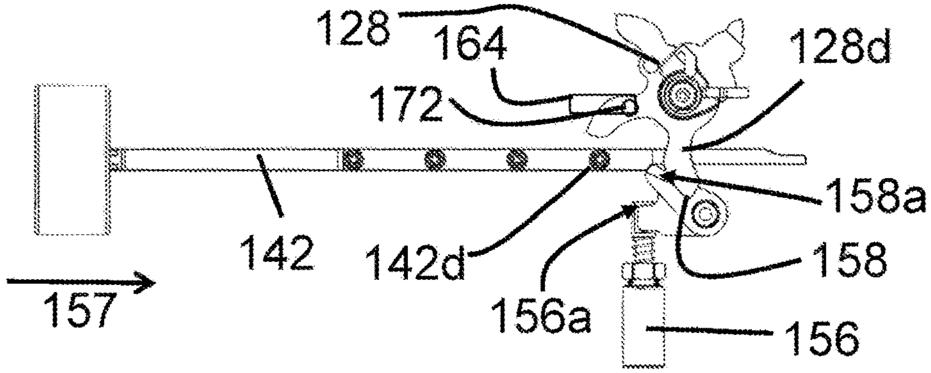

However, with the latch 158 and the solenoid 156, the damage caused by the drive blade 142 to the last tooth 128*d* can be avoided. In particular, when the drive gear 128 rotates to the position as shown in FIG. 10*c*, the magnet 172 becomes the closest to the gear sensor 164 during the entire striking cycle. As such, an output of the gear sensor 164 to the control circuit at this moment is indicative of the rotary position of the drive gear 128. Based on the signal from the gear sensor 164, the control circuit then controls immediately the solenoid 156 to operate by moving the actuating end 156*a* of the solenoid 156 upward, so that the movable end 158*a* of the latch 158 also moves upward and couple with the recess 142*e* on the drive blade 142. The movable end 158*a* abuts the recess 142*e* and secures the drive blade 142 such that the drive blade 142 is not able to move along its striking direction (as indicated by arrow 157) in FIG. 10*c*. At the same time the solenoid 156 is actuated, the motor of the pneumatic tool is stopped by the control circuit. In this way, the possible damage to the fourth tooth 128*d* of the drive gear 128 by lugs on the drive blade 142 can be avoided. The user can also clean the jammed nail safely when the motor is stopped.

Figure 10D:
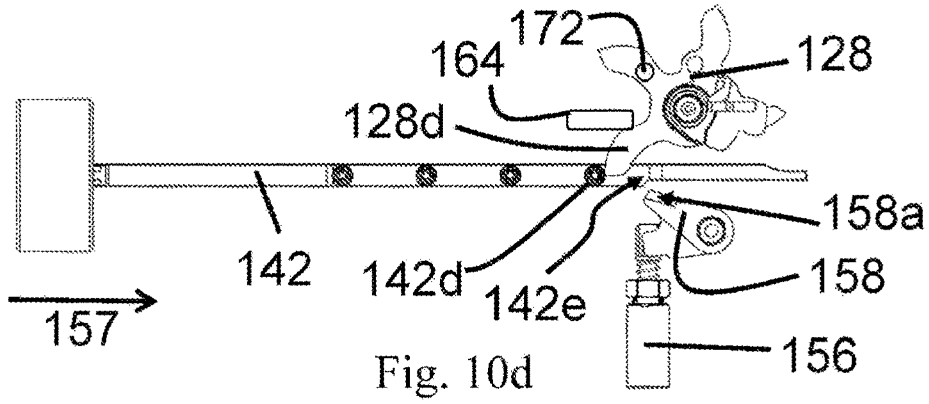

After the jammed nail is cleaned, to resume the operation the user has to presses on the trigger on the pneumatic tool. Then, after a determination of the position of the drive gear 128 (which will be described in more details later), the motor will drive gear 128 to rotate in the clockwise direction, so that after the status shown in FIG. 10*c*, the rotating drive gear 128 will ultimately have its fourth tooth 128*d* contacting with the fourth lug 142*d* (which has been still since the status shown in FIG. 10*c*). Nonetheless, as mentioned above the latch 158 only stops the drive blade 142 from moving along the striking direction, but the drive blade 142 is free to move along the opposite direction, which is the direction for energy accumulation. As a result, the rotation of the drive gear 128 will move the drive blade 142 along an opposite direction of the striking direction 157 a little bit, as shown in FIG. 10*d*. At the same time the drive blade 142 starts to move in the opposite direction, the control circuit unlocks the drive blade 142 by releasing the latch 158 from the drive blade 142 by controlling the solenoid 156. The control circuit knows when the drive blade 142 starts moving since a predetermined time has passed since the status of the drive gear 128 in FIG. 10*c*, and until the fourth tooth 128*d* contacts the fourth lug 142*d* which is at a known position when the drive blade 142 is locked. When the drive gear 128 keeps rotating, at the moment when the fourth tooth 128*d* completely left the fourth lug 142*d*, the drive blade 142 is at a Top Dead Center (TDC) position corresponding to a 100% energy accumulation status of the gas spring, immediately thereafter the drive blade 142 moves rapidly in the striking direction 157 and hit the nailer ultimately, as mentioned previously.

It should be noted that the operations of the solenoid 156, the latch 158, the gear sensor 164 and drive blade 142 are always as those described above, irrespective of whether there is a nail jam condition or not. Even in normal operations where there is no nail jam, the drive blade 142 is always locked at the 85% energy accumulation position and to strike a nail the drive blade 142 is moved to its 100% position by a rotation of the drive gear 128. An operating method of the pneumatic tool below will explain the working principles of the pneumatic tool more clearly.

Figure 11:
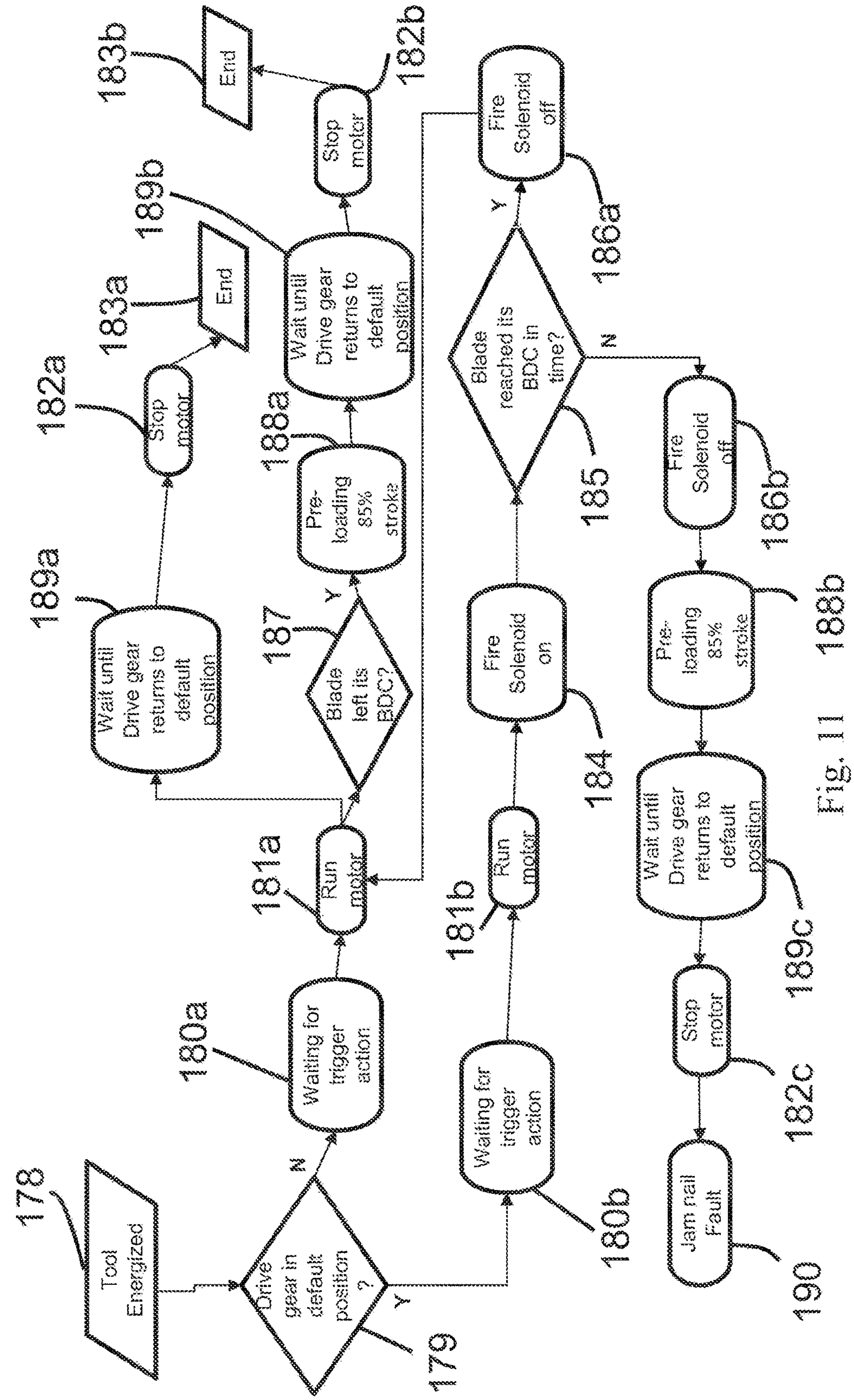
FIG. 11 is a flowchart showing the operation of the pneumatic tool of FIG. 7 in a single-shot operation.
Figure 12A:
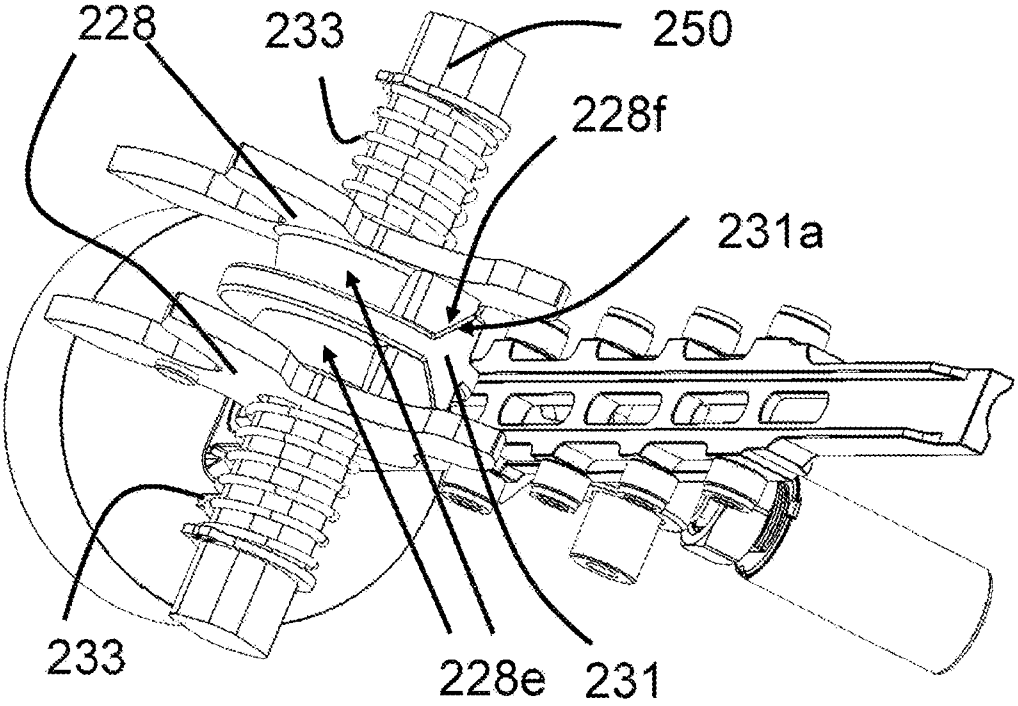
FIGS. 12*a*-12*b* show the internal structures of a drive mechanism and an disengagement mechanism of a pneumatic tool according to another embodiment of the invention.
Figure 12B:
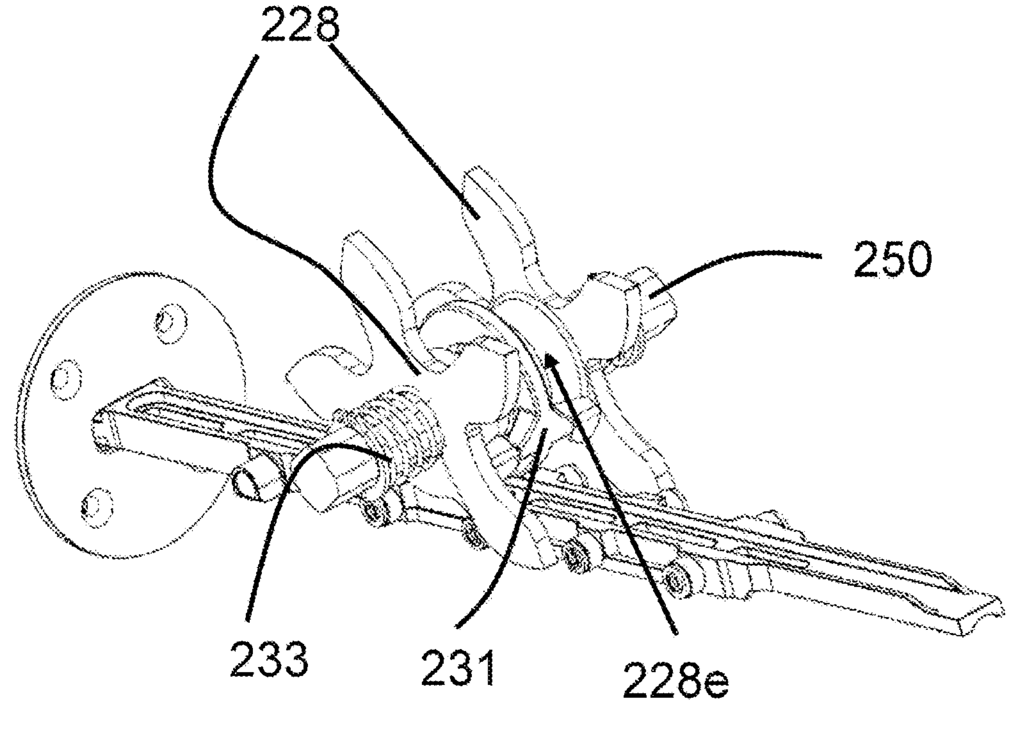

Turning to FIG. 11, in the flowchart the operations of the pneumatic tool starting from energization of the tool until the completion of a single-shot action are shown. In Step 178 the tool is energized, for example by operating a main switch (not shown) on the pneumatic tool. Then, in Step 179 a self-inspection procedure will be carried out by the control circuit of the pneumatic tool, which includes checking the position of the drive gears 128. A default position of the drive gears 128 is set to be the position as shown in FIG. 10*c*, in which the magnet 172 is closest to the gear sensor 164. If in Step 179 it is determined that the drive gears 128 are not in their default positions, for example when the pneumatic tool was previously powered off accidently due to loss of power supply, then the method goes to Step 180*a* started with which the position of the driver gears 128 and/or the drive blade 142 will be calibrated before actual nailing operation. If in Step 179 it is determined that the drive gears 128 are in their default positions, then the method goes to Step 180*b* started with which the actual nailing operation will start.

If in Step 179 it is determined that the drive gears 128 are not in their default positions, then in Step 180*a* the control circuit will do nothing until the user presses the trigger. Once the trigger is pressed, then the motor will start to rotate in Step 181*a*. As the motor is rotating, the drive gears 128 will also be driven to rotate and the calibration will then be split into two independent processes which are started simultaneously. The first process includes waiting until the drive blade 142 leaves its BDC position due to the rotation of the drive gears 128. The determination of the drive blade 142 leaving its BDC position is carried out by the control circuit based on the output of the blade sensor 165. If the drive blade 142 has left its BDC position, then the drive blade 142 is further driven until the drive blade 142 comes to the 85% stroke position (i.e., default position) as a result of controlling the motor to rotate for a predetermined time which is translated to a predetermined travel distance of the drive blade 142. Then, after the drive blade 142 reaches the default position, in Step 189*b* the control circuit waits until the drive gears 128 reach their default positions. Finally, the motor is stopped rotating in Step 182*b*, and the method ends in Step 183*b*. The second process includes the control circuit waiting until the drive gears 128 reach their default positions in Step 189*a*. After that, the motor is stopped rotating in Step 182*a*, and the method ends in Step 183*a*.

It should be understood that the method as split into two processes goes to an end as soon as one of the two processes comes to an end. In other words, after Step 181*a* at one hand the drive gears 128 are reset to their default positions, and at the same times the drive blade 142 is reset to its default position. The benefit of having two processes as such is that there are many possible nail jam situations and when the drive gears 128 is out of phase with the drive blade 142 due to the jammed nail, it could either be the case that the drive gears 128 are more proximate to their default positions in terms of timing than the drive blade 142, or vice versa. The above two processes automatically balance such differences preventing the drive gears 128 and the drive blade 142 from entering synchronization, and by the end of the method both drive gears 128 and the drive blade 142 are always ensured to be at their respective default positions.

Turning back to Step 179, if it is determined that the drive gears 128 are in their default positions, then it means that the pneumatic tool before it was energized in Step 178 was in normal status, since if the drive gears 128 are in their default positions the drive blade 142 must also be in its default, 85% stroke position. Therefore, the pneumatic tool can directly start its nailing operation in Step 180*b*, subject to the pressing of trigger by the user. Once the trigger is pressed, the motor starts to run in Step 181*b*, and similar to what is described for FIGS. 10*c*-10*d*, the drive blade 142 will be pushed back by the drive gears 128 a little bit to its 100% energy accumulation status. Then, the solenoid 156 is turned on in Step 184 which releases the latch 158 from the drive blade 142, and the drive blade 142 performs the nail striking operation. The solenoid 156 will only be turned on for a certain time, e.g., 100 ms, and then it will be turned off in either Step 186*a* or Step 186*b*. After Step 184, next the control circuit in Step 185 determines if the drive blade 142 reaches its BDC position through the blade sensor 165 within a predetermined time. If yes, it means that the nail striking was performed smoothly without any problem, and the method proceeds to Step 186*a* in which the motor is stopped, and then method continues at Step 181*a* to perform the reset procedure as already described above.

If in Step 185 it is determined that the drive blade 142 did not reach its BDC position within the desired time, then it is considered to be abnormal case, for example resulted by nail jam. The method in this case proceeds to Step 186*b* in which the motor is stopped. It is now certain that the drive blade 142 did not reach its BDC position, but the drive gears 128 are at an angular position furthest from their default positions since the gears 128 finished their predetermined rotation after the certain time by which the drive blade 142 is supposed to be arriving at its BDC position. In other words, the drive blade 142 is closer to its default position (i.e., 85% stroke position) in terms of timing than the drive gears 128 to their default positions. Therefore, the reset procedures of the pneumatic are then started with the drive blade 142 back to its default position first in Step 188*b*, followed by Steps 189*c* and Step 182*c* which are identical to Step 189*b* and Step 182*b* as mentioned above. The method then ends with a prompt to the user (e.g., via a LED indicator or a sound buzzer) that there is a nail jam condition to be solved. The user can then power off the pneumatic tool and cleans the jammed nail.

Figure 13:
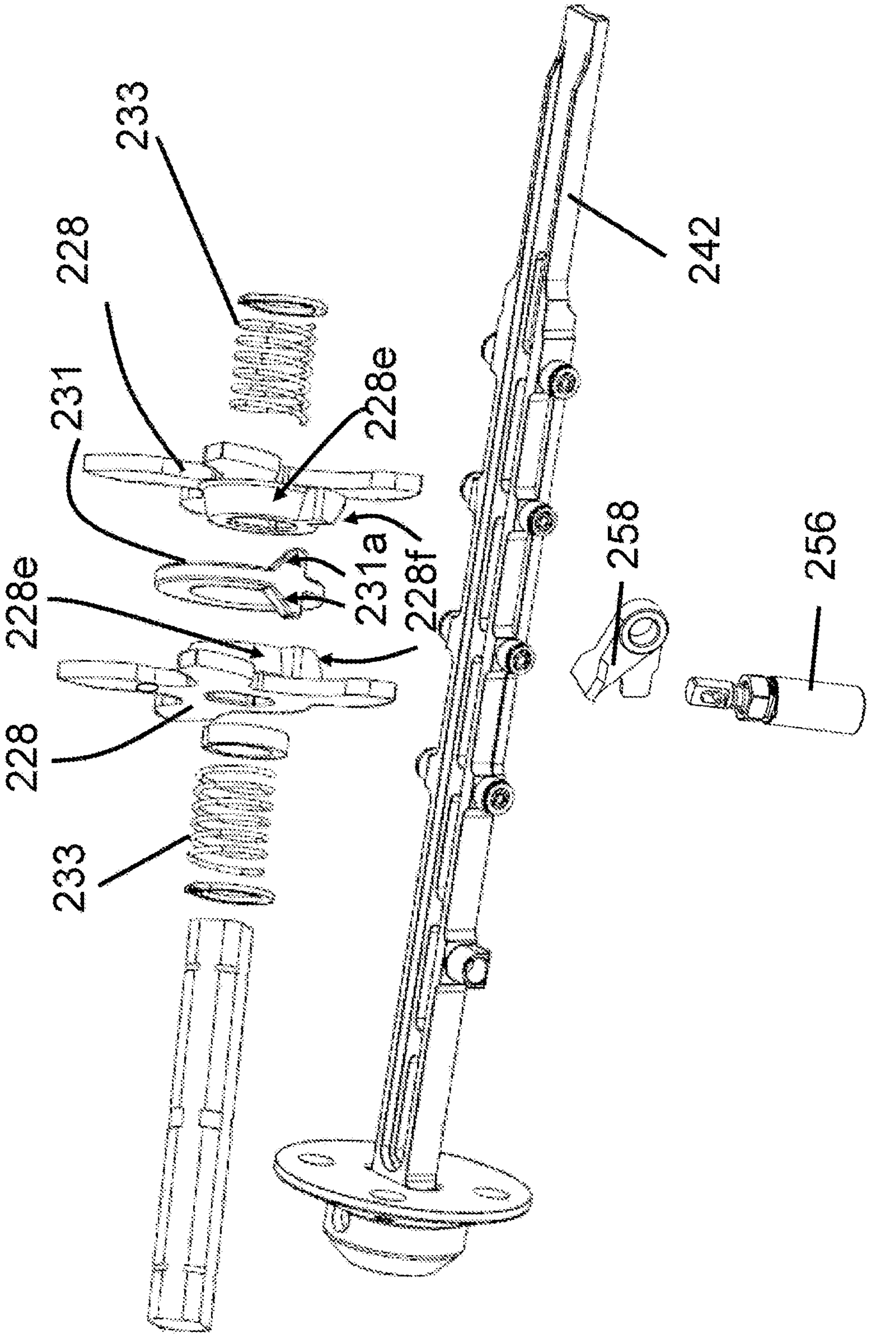
FIG. 13 shows an exploded view of internal structures of the drive mechanism and the disengagement mechanism of a pneumatic tool in FIGS. 12*a*-12*b*.
Figure 14A:
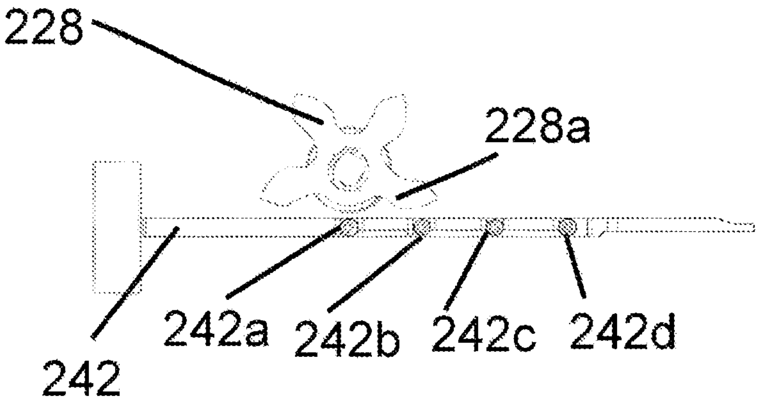
FIGS. 14*a*-14*f* show different status of a drive gear and the drive blade during an abnormal operation of the pneumatic tool in FIGS. 12*a*-12*b*.
Figure 14B:
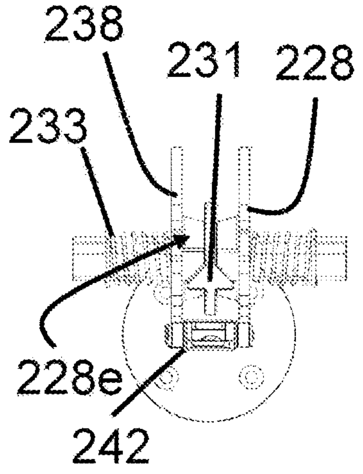
Figure 14C:
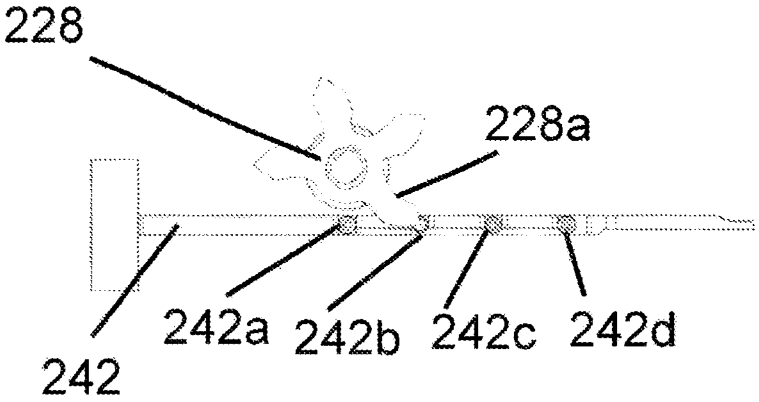
Figure 14D:
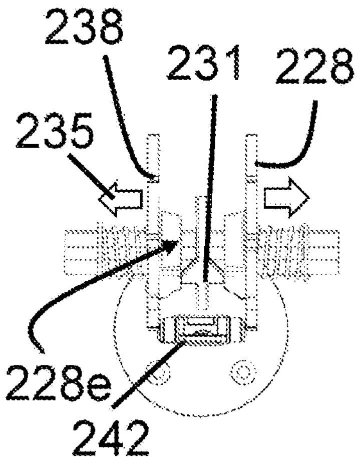

FIGS. 12*a*-12*b*, 13 and 14*a*-14*c* show another embodiment of the present invention in which a pneumatic tool with a jamming-alleviating mechanism which, although not able to completely eliminate a nail jam in the nailer, nonetheless facilitates clearing the jammed nail and also protects mechanical parts in the nailer from potential damages caused by moving parts. The pneumatic tool contains a drive blade 242 and two parallel drive gears 228 engageable with the drive blade 242. For the simplicity of illustration, other components such as the motor and various gears in the drive mechanism are not shown, but these components are configured and operate in a similar way as those described in FIGS. 1-6. The general working principle of the drive blade 242 and the drive gears 228 in the drive mechanism is also similar to those in FIGS. 1-6, which will not be described in detail here for the sake of simplicity. Instead, only the differences between the embodiment of FIGS. 12-13*e* and that of FIGS. 1-6 will be described herein. Compared to the embodiment shown in FIGS. 7-10*d*, the major difference in the pneumatic tool in FIGS. 12-13*e* is that the disengagement mechanism no longer contains a shrinkable member to avoid interference between the first tooth and the drive blade. Rather the disengagement mechanism in this embodiment contains complemental cam surfaces that cooperate with each to achieve axial movement of the drive gears 228. In particular, a wedge 231 is fixedly provided between the two drive gears 228 and the wedge 231 has roughly a circular shape, with a wedge portion having a pair of second cam surfaces 231*a* at a predetermined angular position on the rotational direction of the drive gears 228. Each of the drive gears 228 further contains a flange portion 228*e* adjacent to the wedge 231, but as the flange portion 228*e* is a part of a drive gear 228 the flange portion 228*e* is rotatable with respect to the wedge 231. The drive gears 228 are configured to be axially movable between an original position (as shown in FIGS. 12*a*-12*b*, 14*b* and 14*f*) and an offset position (as shown in FIG. 14*d*) along the main shaft 250, but the two drive gears 228 are each biased by a spring 233 to their original positions. The flange portion 228*e* of each drive gear 228 contains a first cam surface 228*f* corresponding to a respective second cam surface 231*a* on the wedge 231. FIG. 13 shows other components in the nail gun including a latch 258 connected to a solenoid 256. The positions and working principles of the solenoid 256 and latch 258 are similar to those as illustrated and described with respect to FIGS. 7 and 10*a*-10*d*.

Next, with respect to FIGS. 14*a*-14*f*, the operation and working principle of the disengagement module in the nail gun in the above embodiment will be explained. It should be noted that although only one drive gear 228 is illustrated in FIGS. 14*a*, 14*c* and 14*f*, the description hereinafter is applicable to both drive gears 228 in the nail gun as they are symmetrical and have a synchronized operation. The drive gears 228 in FIGS. 14*a*-14*f* rotate along a clockwise direction. FIG. 14*b* shows the same status of the disengagement module, the drive blade 242, and the drive gear 228 as in FIG. 14*a*, but from a different viewing angle. Similarly, FIG. 14*d* shows the same status as in FIG. 14*c*, and FIG. 14*f* shows the same status as in FIG. 14*e*. The disengagement module is capable of facilitating the user's cleaning operation of the jammed nail and reducing safety risks by avoiding interference between the drive gears 228 and the drive blade 242 which may cause difficulty to the user during the cleaning process, and thus the disengagement module helps reduce possible damage to the drive mechanism. In particular, the disengagement module prevents the drive blade 242 from stopping at an abnormal position and eliminates any pressing force on the jammer nailer that would otherwise exist without such a disengagement module.

Figure 14E:
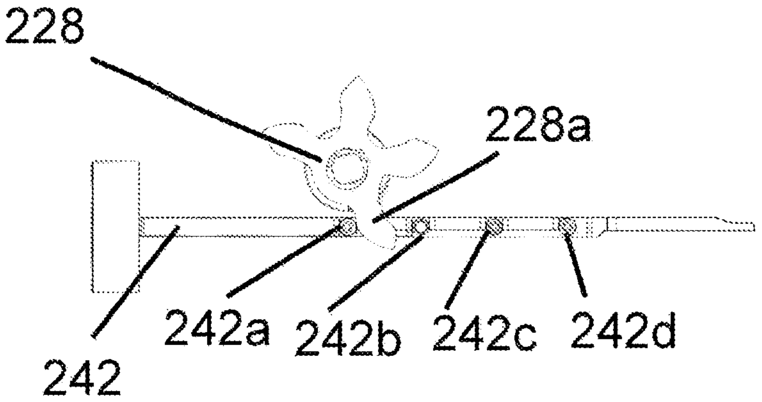
Figure 14F:
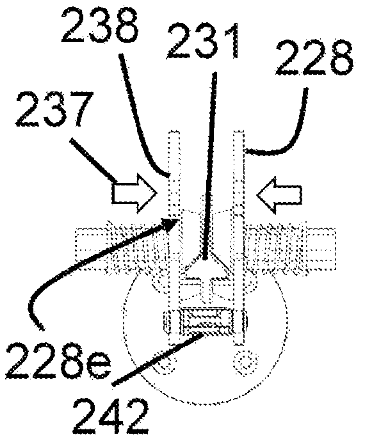

FIGS. 14*a*-14*f* show an abnormal circumstance when a nail jam occurred. As the nail (not shown) is jammed, the intended synchronization between the blade 242 and the drive gear 228 is broken, and this is shown in FIG. 14*a* that the first tooth 228*a* on the drive gear 228 is about to engage with a second lug 242*b* on the drive blade 242 which is not a correct lug for the first tooth 228*a*. As such, there is a misalignment created between the drive blade 242 and the drive gear 228. FIGS. 14*a*, 14*c* and 14*e* show the status of the drive gear 228 and the drive blade 242 in a sequential order. In FIG. 14*a* and FIG. 14*b* the two drive gears 228 are still in their original positions as biased by the springs 233. At this moment the two second cam surfaces 231*a* are about to engage with the two first cam surfaces 228*f* on the two flange portions 228*e*. The angular position of the drive gears 228 at which the first cam surfaces 228*f* and the second cam surface 231*a* engage is carefully chosen so that it happens before the first tooth 228*a* is about to contact with the second lug 242*b*, which is in turn the most common circumstance when a nail jam happens. Then, before the first tooth 228*a* engages with the second lug 242*b* as shown in FIG. 14*b*, the second cam surfaces 231*a* each engages with a corresponding first cam surface 228*f* and such engagement forces the two drive gears 228 to move axially away from each other, and also from the wedge 231 along a direction indicated by arrow 235 in FIG. 14*d*. Such an axial movement moves each drive gear 228 out of a possible contact region with the drive blade 242 so even if the first tooth 228*a* is at the same or similar vertical position in FIGS. 14*b*, 14*d* and 14*e* as the drive blade 242, there is no interference at all, and the drive gears 228 are allowed to further rotate to the position shown in FIG. 14*e*. In this way, there is no force applied to the drive blade 242 by the drive gear 228, and when the user needs to take out the jammed nail from the nail gun it will be much easier for him/her to do so. After the jammed nail is cleared during a power-off state, and the tool is later reenergized, the drive gears 228 will continue to rotate and as a result the second cam surfaces 231*a* each will leave the engagement with a corresponding first cam surface 228*f*, so that the drive gears 228 go back to their original positions as shown in FIG. 14*f* by the force of the springs 233. In this way, the drive gears 228 can subsequently engage with the drive blade 142 in normal operations with the correct pair of lug/tooth engaged, as shown in FIG. 14*e*.

It should be noted in the embodiment as shown in FIG. 12-14*f*, the drive gears 228 will always move axially outward and then inward, irrespective of whether there is any nail jam condition occurred or not.

Figure 15:
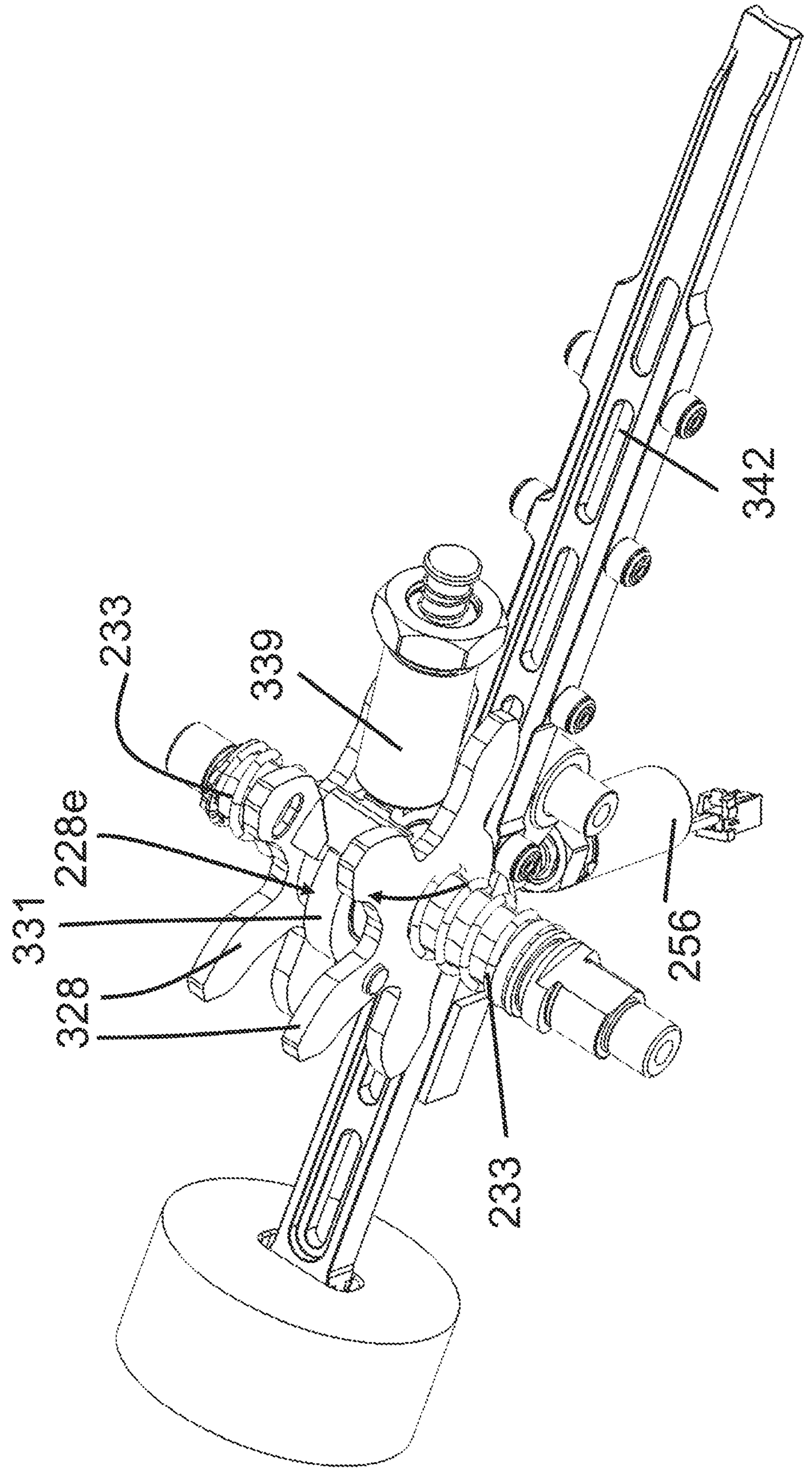
FIG. 15 shows the internal structures of a drive mechanism and an disengagement mechanism of a pneumatic tool according to another embodiment of the invention.
Figure 16A:
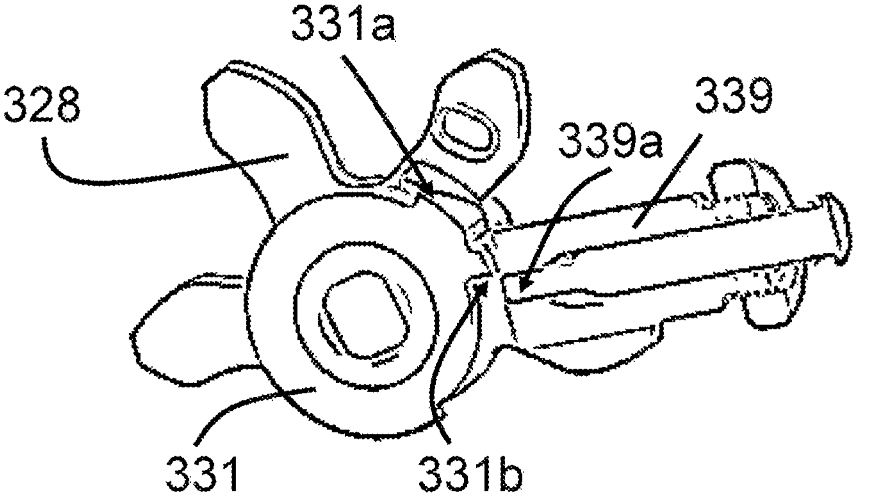
FIGS. 16*a*-16*b* show the different status of a drive gear and a solenoid of the pneumatic tool in FIG. 15.
Figure 16B:
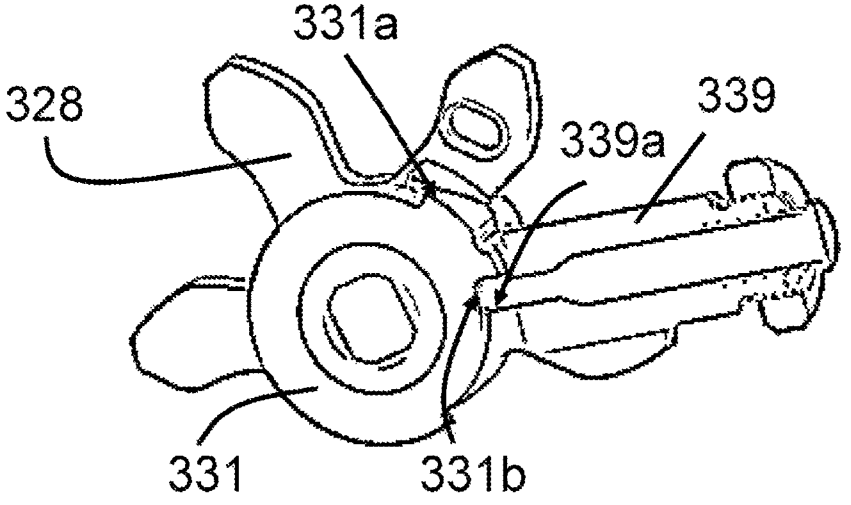

FIGS. 15 and 16*a*-16*b* show another embodiment of the present invention in which a pneumatic tool with a jamming-alleviating mechanism is described. This embodiment is in most aspects similar to that shown in FIGS. 12-14*f*, and therefore similar components between these two embodiments will not be described in detail here again. The only difference is that in FIGS. 15 and 16*a*-16*b*, the wedge 331 is now rotatable together with the drive gears 328 for most of the time in the striking cycle. However, within a predetermined time period the wedge 331 can be fixed and not rotatable with the drive gears 328. This is achieved by configuring a solenoid 339 which contains a movable actuating end 339*a* that is engageable with an indent 331*b* on the wedge 331 which is located adjacent to the second cam surfaces 331*a* on the wedge 331. As shown in FIGS. 16*a*-16*b* the indent 331*b* is located in front of the second cam surfaces 331*a* along the clockwise rotational direction of the drive gears 328. The solenoid 339 is controlled by a control circuit of the pneumatic tool.

Next, with respect to FIGS. 16*a*-16*b*, the operation and working principle of the disengagement module in the nail gun in the above embodiment will be explained. It should be noted that although only one drive gear 328 is illustrated in FIGS. 16*a*-16*b*, the description hereinafter is applicable to both drive gears 328 in the nail gun as they are symmetrical and have a synchronized operation. The drive gears 328 in FIGS. 16*a*-16*b* rotate along a clockwise direction. In the status shown in FIG. 16*a*, the solenoid 339 is not turned on, so an actuating end 339*a* of the solenoid 339 does not stretch out or contacts with the drive gears 328. As such, the wedge 331 rotates with the drive gears 328 together, and the second cam surfaces 331*a* have no chance to engage with the first cam surfaces (not shown) on the flange portions of the drive gears 328. In this way, the wedge 331 and drive gears 328 do not suffer from mechanical wear that is otherwise caused by the contact between the second cam surfaces 331*a* and the first cam surfaces.

FIG. 16*b* shows another status of the solenoid 339 which is turned on, so an actuating end 339*a* of the solenoid 339 stretches out and contacts with the drive gears 328. As such, the wedge 331 is prohibited from rotation with the drive gears 328 together, and the second cam surfaces 331*a* will then engage with the first cam surfaces (not shown) which would urge the drive gears 328 to move axially outward to avoid interference between teeth on the drive gears 328 and lugs on the drive blade 142. In this embodiment, the solenoid 339 is not turned on as long as there is no potential nail jam condition, for example if the drive blade 142 can reach its BDC position in time (as in Step 185 in FIG. 11). However, when there is a potential nail jam condition, then the control circuit will turn on the solenoid 339 to cause the axial movement of the drive gears 328. In this way, there is no force applied to the drive blade 342 by the drive gear 328, and when the user needs to take out the jammed nail from the nail gun it will be much easier for him/her to do so.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

It is to be understood that, if any prior art publication is referred to herein, such reference does not constitute an admission that the publication forms a part of the common general knowledge in the art, in Australia or any other country.

For example, the driving gear and the driving bar described above all show a specific shape in the drawings, and there are four tooth-to-bump pairs in contact with each other. However, those skilled in the art need to understand that in other variations of the present invention, both the driving gear and the driving bar may have different shapes, and the number of tooth-bump pairs may also be different. Any movement (e.g., reciprocating) in both directions of the piston by means of an unequal arrangement of the teeth on the gear will fall within the scope of the present invention.

The flow chart in FIG. 11 shows the operation of a single-shot mode of the pneumatic tool, with the motor stopped at the end of the operation. However, one skilled in the art should realize that similar operation steps can be applied in a multiple-shot mode of the pneumatic tool. For example, if the pneumatic tool operates normally without nail jamming, then after each striking cycle is completed the drive gear keeps rotating and starts the next cycle automatically. The method will then repeat between Step 184 and Step 186*a* in FIG. 11 continuously while the user keeps pressing the trigger, until the moment the user releases the trigger.

In addition, although the embodiments described above are pneumatic tools, one skilled in the art should realize that the invention can be used on other fastener tools with different types of energy storage unit instead of a gas spring. For example, the invention can also be applied to fastener tools with metal springs.

In some of the drawings shown above only one of two drive gears in the pneumatic tool is shown. However, it should be realized that in the case of two drive gears configured in parallel in the pneumatic tool, their operations are always synchronized in terms of angular positions and engagement with the drive blade. It should be further noted that the present invention may be applied to different types of pneumatic tools, no matter if they contain only one drive gear, or two, or even more than two.

FIGS. 10*a*-10*d* above illustrate the operation of a solenoid and a latch for locking the drive blade in relation to output from a gear sensor, and FIG. 11 shows the overall control logic of the pneumatic tool including the operations of the solenoid, the latch and the gear sensor. Those skilled in the art should realize that the same solenoid and latch operation and the control logic could equally be applied to other variations of the invention. For example, the method and operations shown in FIGS. 10*a*-10*d* and 11 can be directly applied to the embodiments shown in FIGS. 12*a*-14*f* and the FIG. 15-16*b*.

The invention claimed is:

1. A fastener tool comprising:

a motor;

a drive mechanism connected to the motor and adapted to drive a piston; and a cylinder filled with compressed gas, wherein the piston is accommodated in the cylinder and suitable for a reciprocating motion within the cylinder, wherein the drive mechanism includes a blade fixed to the piston and a gear coupled to the motor, wherein the gear includes a gear body and a plurality of teeth spaced apart on the gear body adapted to engage with a plurality of lugs on the blade such that a rotation of the gear is transformed to a linear movement of the blade, wherein the drive mechanism further includes a disengagement module which, within a period of a rotation cycle of the gear, is configured to prevent interference between a first tooth of the plurality of teeth and a misaligned one of the lugs of the blade during the rotation cycle, wherein the gear body includes a groove defining a path in which at least part of the first tooth is movable between an extended position and a shrunken position, and wherein the disengagement module includes a stopper element mounted on and rotatable with the gear body, into which at least part of the stopper element inhabits part of the groove and blocks the path of the first tooth to its shrunken position within the period, and is configured to engage an actuator adapted to urge the stopper element out of the groove enabling the first tooth to move into the shrunken position outside the period.

2. The fastener tool of claim 1, wherein the plurality of teeth of the gear are spaced apart on the gear body of the gear in a rotational direction by at least a first pitch and a second pitch different from the first pitch respectively, wherein the first pitch is smaller than the second pitch, and wherein one of the plurality of teeth being the first tooth after the second pitch in the rotational direction.

3. The fastener tool of claim 2, wherein the actuator is not rotatable with the gear body.

4. The fastener tool of claim 3, wherein the actuator is engageable with the stopper element to move the stopper element outside the groove, thereby unblocking the path and allowing the first tooth to retract.

5. The fastener tool of claim 2, wherein the stopper element is biased by a spring element to block the path.

6. The fastener tool of claim 2, wherein the first tooth is biased by a spring element to its extended position.

7. The fastener tool of claim 1, further comprising a sensor adapted to determine an angular position of the gear.

8. A fastener tool comprising:

a motor;

a drive mechanism connected to the motor and adapted to drive a piston; and a cylinder filled with compressed gas, wherein the piston is accommodated in the cylinder and suitable for a reciprocating motion within the cylinder;

wherein the drive mechanism includes a blade fixed to the piston and a gear coupled to the motor, wherein the gear includes a plurality of teeth adapted to engage with a plurality of lugs on the blade such that a rotation of the gear is transformed to a linear movement of the blade, and wherein the gear further includes a gear body and a movable tooth which, within a period of a rotation cycle of the gear, is configured to move along the gear body to prevent interference between the movable tooth and a misaligned one of the lugs of the blade during the rotation cycle, wherein the gear body includes a groove in which at least part of the movable tooth is movable between an extended position and a shrunken position, and wherein the drive mechanism includes a stopper element at least partially movable into the groove preventing the movable tooth from moving to the shrunken position within the period, and which is urged by an actuator out of the groove so that the movable tooth is able to retract into the shrunken position when contacting a misaligned lug of the plurality of lugs outside the period.

9. The fastener tool of claim 8, wherein the plurality of teeth of the gear are spaced apart on the gear body in a rotational direction by at least a first pitch and a second pitch different from the first pitch respectively, wherein the first pitch is smaller than the second pitch, and wherein the movable tooth is a first of the plurality of teeth after the second pitch in the rotational direction.

10. The fastener tool of claim 8, wherein the movable tooth is biased by a spring to the extended position.

11. The fastener tool of claim 10, wherein the stopper element is biased by a second spring to block a path of the movable tooth.

12. A fastener tool comprising:

a motor;

a drive mechanism connected to the motor and adapted to drive a piston; and a cylinder filled with compressed gas, wherein the piston is accommodated in the cylinder and suitable for a reciprocating motion within the cylinder;

wherein the drive mechanism includes a blade fixed to the piston and a gear coupled to the motor, wherein the gear includes a plurality of teeth adapted to engage with a plurality of lugs on the blade such that a rotation of the gear is transformed to a linear movement of the blade, wherein a first tooth of the plurality of teeth is movable relative to a gear body between an extended position and a shrunken position, wherein the gear body includes a groove defining a path in which at least part of the first tooth is movable between the extended position and the shrunken position, wherein the drive mechanism further includes a disengagement module configured to block the path of the first tooth from the extended position to the shrunken position, allowing the first tooth to engage with the lugs of the blade, and wherein the disengagement module is further configured to release the path of the first tooth during a period of rotation of the gear, allowing the first tooth to move to the shrunken position, wherein the disengagement module further comprises a stopper element that blocks the path of the first tooth to the shrunken position within the period, and wherein the stopper element is biased by a first spring to block the path, and wherein the first tooth is biased by a second spring to the extended position, allowing the first tooth to move to the extended position outside the period.

13. The fastener tool of claim 12, wherein the disengagement module further comprises an actuator not rotatable with the gear body, and wherein the actuator is adapted to urge the stopper element to move out of the path.

* * * * *